United States Patent
Chen et al.

(10) Patent No.: US 12,432,375 B2
(45) Date of Patent: Sep. 30, 2025

(54) FILTERING METHOD FOR REMOVING BLOCKING ARTIFACT AND APPARATUS

(71) Applicant: HUAWEI TECHNOLOGIES CO., LTD., Shenzhen (CN)

(72) Inventors: Huanbang Chen, Shenzhen (CN); Sixin Lin, Shenzhen (CN); Haitao Yang, Shenzhen (CN); Shan Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/538,941

(22) Filed: Dec. 13, 2023

(65) Prior Publication Data

US 2024/0267553 A1 Aug. 8, 2024

Related U.S. Application Data

(63) Continuation of application No. 17/590,580, filed on Feb. 1, 2022, now Pat. No. 11,889,102, which is a (Continued)

(30) Foreign Application Priority Data

Jan. 29, 2016 (CN) .......................... 201610064753.8

(51) Int. Cl.
*H04N 19/52* (2014.01)
*H04N 19/117* (2014.01)
(Continued)

(52) U.S. Cl.
CPC .......... *H04N 19/52* (2014.11); *H04N 19/117* (2014.11); *H04N 19/119* (2014.11);
(Continued)

(58) Field of Classification Search
None
See application file for complete search history.

(56) References Cited

U.S. PATENT DOCUMENTS

| | | |
|---|---|---|
| 8,792,561 B2 | 7/2014 | Min et al. |
| 2005/0225553 A1 | 10/2005 | Chi |

(Continued)

FOREIGN PATENT DOCUMENTS

| | | |
|---|---|---|
| CN | 101653008 A | 2/2010 |
| CN | 102598670 A | 7/2012 |

(Continued)

OTHER PUBLICATIONS

"Algorithm Description of Joint Exploration Test Model 1 (JEM1)," ISO/IEC JTC1/SC29/WG11/N15790, Geneva, CH, XP030022473, International Organization for Standardization: Coding of Moving Pictures and Audio (Oct. 2015).
(Continued)

*Primary Examiner* — Talha M Nawaz
(74) *Attorney, Agent, or Firm* — Leydig, Voit & Mayer, Ltd.

(57) ABSTRACT

The present invention relates to the field of video image processing, and provides a filtering method and an apparatus, to resolve a problem that subjective quality and objective quality of an image deteriorate because filtering processing cannot be performed on internal blocks of a non-translational motion prediction unit.

20 Claims, 5 Drawing Sheets

Horizontal filtering boundary

Related U.S. Application Data continuation of application No. 16/047,325, filed on Jul. 27, 2018, now Pat. No. 11,265,572, which is a continuation of application No. PCT/CN2016/089797, filed on Jul. 12, 2016.

(51) Int. Cl.

| | |
|---|---|
| *H04N 19/119* | (2014.01) |
| *H04N 19/139* | (2014.01) |
| *H04N 19/176* | (2014.01) |
| *H04N 19/43* | (2014.01) |
| *H04N 19/583* | (2014.01) |
| *H04N 19/61* | (2014.01) |
| *H04N 19/86* | (2014.01) |

(52) U.S. Cl.
CPC ......... *H04N 19/139* (2014.11); *H04N 19/176* (2014.11); *H04N 19/43* (2014.11); *H04N 19/583* (2014.11); *H04N 19/61* (2014.11); *H04N 19/86* (2014.11)

(56) References Cited

U.S. PATENT DOCUMENTS

| | | | |
|---|---|---|---|
| 2011/0097004 A1 | 4/2011 | Lee et al. | |
| 2013/0051480 A1 | 2/2013 | Norkin et al. | |
| 2013/0077682 A1 | 3/2013 | Han et al. | |
| 2013/0128974 A1 | 5/2013 | Chien et al. | |
| 2014/0341271 A1 | 11/2014 | Mody et al. | |
| 2014/0355684 A1* | 12/2014 | Narroschke | H04N 19/82 375/240.16 |
| 2015/0085935 A1 | 3/2015 | Chen et al. | |
| 2015/0131717 A1 | 5/2015 | Min et al. | |
| 2015/0229939 A1* | 8/2015 | Song | H04N 19/136 375/240.12 |
| 2015/0256850 A1* | 9/2015 | Kottke | H04N 19/513 375/240.16 |
| 2015/0271514 A1 | 9/2015 | Yoshikawa et al. | |
| 2017/0188041 A1 | 6/2017 | Li et al. | |
| 2017/0214932 A1 | 7/2017 | Huang | |
| 2018/0070102 A1* | 3/2018 | Zhang | H04N 19/57 |

FOREIGN PATENT DOCUMENTS

| | | |
|---|---|---|
| CN | 103916676 A | 7/2014 |
| CN | 103957425 A | 7/2014 |
| CN | 104539966 A | 4/2015 |
| CN | 104581153 A | 4/2015 |
| WO | 2014039229 A1 | 3/2014 |

OTHER PUBLICATIONS

"Affine transform prediction for next generation video coding," Telecommunication Standardization Sector Study Period 2013-2016, COM xxx-C1016-E, XP030100743, pp. 1-11, International Telecommunications Union, Geneva, Switzerland (Oct. 2015).

Wiegand et al., "Draft ITU-T Recommendation and Final Draft International Standard of Joint Video Specification (ITU-T Rec. H.264 ISO/IEC 14496-10 AVC)," Joint Video Team (JVT) of ISO/IEC MPEG and ITU-T VCEG (ISO/IEC JTC1/SC29/WG11 and ITU-T SG16 Q.6), 7th Meeting: Pattaya, Thailand, Mar. 7-14, 2003, JVT-G050, 264 pages.

ITU-T H.264, Series H: Audiovisual and Multimedia Systems Infrastructure of audiovisual services—Coding of moving video Advanced video coding for generic audiovisual services, Feb. 2014, 790 pages.

ITU-T H.265, Series H: Audiovisual and Multimedia Systems Infrastructure of audiovisual services—Coding of moving video High efficiency video coding, Apr. 2015, 634 pages.

* cited by examiner

| $p_{3,0}$ | $p_{2,0}$ | $p_{1,0}$ | $p_{0,0}$ | $q_{0,0}$ | $q_{1,0}$ | $q_{2,0}$ | $q_{3,0}$ |
| $p_{3,1}$ | $p_{2,1}$ | $p_{1,1}$ | $p_{0,1}$ | $q_{0,1}$ | $q_{1,1}$ | $q_{2,1}$ | $q_{3,1}$ |
| $p_{3,2}$ | $p_{2,2}$ | $p_{1,2}$ | $p_{0,2}$ | $q_{0,2}$ | $q_{1,2}$ | $q_{2,2}$ | $q_{3,2}$ |
| $p_{3,3}$ | $p_{2,3}$ | $p_{1,3}$ | $p_{0,3}$ | $q_{0,3}$ | $q_{1,3}$ | $q_{2,3}$ | $q_{3,3}$ |

P

Q

Horizontal filtering boundary

FILTERING METHOD FOR REMOVING BLOCKING ARTIFACT AND APPARATUS

CROSS-REFERENCE TO RELATED APPLICATIONS

This application is a continuation of U.S. patent application Ser. No. 17/590,580, filed on Feb. 1, 2022, now U.S. Pat. No. 11,889,102, which is a continuation of U.S. patent application Ser. No. 16/047,325, filed on Jul. 27, 2018, now U.S. Pat. No. 11,265,572, which is a continuation of International Application No. PCT/CN2016/089797, filed on Jul. 12, 2016. The International Application claims priority to Chinese Patent Application No. 201610064753.8, filed on Jan. 29, 2016. All of the afore-mentioned patent applications are hereby incorporated by reference in their entireties.

TECHNICAL FIELD

Embodiments of the present invention relate to the field of video image processing, and in particular, to a filtering method for removing a blocking artifact and an apparatus.

BACKGROUND

In a video coding compression technology, block-based hybrid video coding is mainly performed, to divide a video image of one frame into a plurality of blocks, and implement video coding compression on a per-block basis through prediction (including intra-frame prediction and inter-frame prediction), transformation, quantization, entropy encoding, and other steps. To be specific, motion information of a block is first obtained through block-based motion compensation prediction (MCP), and a predicted pixel value of the block is determined based on the motion information; then transformation and quantization are performed on a residual between an original pixel value and the predicted pixel value of the block; and finally quantized transform coefficients and coding mode information (such as a code block size, a prediction mode, a motion vector, and other information) are converted into bit-streams through entropy encoding processing and the bit-streams are sent to a decoder.

Because the block-based hybrid video coding is to divide each image into blocks of different sizes and then perform block prediction, block transformation, and block quantization, a correlation between blocks is overlooked, and reconstruction precision of a pixel value on a boundary of a block is lower than that of a pixel value in the middle of the block, resulting in block incoherence, namely, a "blocking artifact". Consequently, an image obtained after decoding and reconstruction is evidently presented like blocks spliced together. Therefore, after the decoding and reconstruction, "blocking artifact removal" processing needs to be performed on the image.

Currently a common method for removing a blocking artifact is overlapped block motion compensation (OBMC). This method considers all motion vectors as a continuous field, and suggests that an internal pixel is not only affected by a motion vector of a current block but also affected by surrounding motion vectors to a large extent. Motion vectors of sub-blocks adjacent to the current block in up, down, left, and right directions are obtained. If the motion vectors exist and are different from the motion vector of the current block, motion compensation is performed on the current block by using the motion vectors, to obtain a new predicted signal of the current block, and an original predicted signal of the current block and the new predicted signal of the current block are weighted and filtered to remove a "blocking artifact".

The foregoing method is performed based on a translational motion model, in other words, provided that all motions in an image block are translational motions. Therefore, the existing OBMC suggests that only blocks that are located on upper and left boundaries are filtered. In this case, if the image block includes subunits of a non-translational mode (for example, an affine motion model), and motion vectors of these subunits are different, filtering processing cannot be performed on the internal subunits of the image block if the foregoing method is still used. Therefore, a "blocking artifact" still exists between blocks, affecting coding precision and subjective and objective effects.

SUMMARY

A main objective of the present invention is to provide a filtering method for removing a blocking artifact and an apparatus, to resolve a problem that a "blocking artifact" between internal prediction unit blocks cannot be handled, and coding precision and subjective and objective effects are affected.

To achieve the foregoing objective, the following technical solutions are used in embodiments of the present invention.

According to a first aspect, an embodiment of the present invention provides a filtering method for removing a blocking artifact, used to perform filtering processing on an image block, where the image block is divided into at least one prediction unit and at least one transform unit, and the prediction unit includes a non-translational motion prediction unit. The method may include:

dividing each prediction unit into at least two subunits, where each subunit includes N×N pixels, and N is an integer greater than or equal to 1;

traversing each of the at least two subunits, and determining at least one filtering boundary of the at least two subunits based on a preset rule;

for any one of the at least one filtering boundary, obtaining a first pixel value of a first subunit and a first pixel value of a second subunit, where the first subunit and the second subunit are adjacent to the filtering boundary; and performing, based on the first pixel value of the first subunit and the first pixel value of the second subunit, filtering processing on pixels adjacent to the filtering boundary.

When the filtering boundary is horizontal, the first subunit is an upper subunit adjacent to the filtering boundary, and the second subunit is a lower subunit adjacent to the filtering boundary; or when the filtering boundary is vertical, the first subunit is a left subunit adjacent to the filtering boundary, and the second subunit is a right subunit adjacent to the filtering boundary.

In this way, all filtering boundaries in the prediction unit are determined, and filtering processing is performed on pixels adjacent to the filtering boundaries, so that a "blocking artifact" between unit blocks with different motion vectors is removed, and prediction precision and subjective quality of an image are improved.

Optionally, in an implementable manner of the first aspect, for the subunit in the at least two subunits, if a first boundary of the subunit is a sub-block boundary of the prediction unit in the image block or a first boundary of the subunit is a sub-block boundary of the transform unit in the image block, the first boundary of the subunit is determined as a filtering boundary, where the first boundary is any boundary of the subunit. In addition, if the subunit is included in the non-translational motion prediction unit, each boundary of the first subunit is determined as a filtering boundary.

In this way, not only a boundary that is in the prediction unit and that is located on the sub-block boundary of the prediction unit or the sub-block boundary of the transform unit is determined as a filtering boundary, and subsequent filtering processing is performed on the boundary, but also a boundary of the non-translational motion prediction unit can be determined as a filtering boundary, and filtering processing is performed on the boundary of the non-translational motion prediction unit in the prediction unit, so that a blocking artifact between non-translational motion prediction units in the prediction unit is removed.

Optionally, in another implementable manner of the first aspect, the obtaining a first pixel value of a first subunit adjacent to the filtering boundary may include:
  obtaining a first predicted pixel value of the first subunit;
  calculating motion vectors of M subunits in an upper subunit, a lower subunit, a left subunit, and a right subunit that are adjacent to the first subunit;
  obtaining M second predicted pixel values of the first subunit based on the motion vectors of the M subunits; and
  obtaining the first pixel value of the first subunit based on the first predicted pixel value of the first subunit and the M second predicted pixel values by using a first preset algorithm, where
  M is any integer ranging from 1 to 4.

The calculating a motion vector of each of an upper subunit, a lower subunit, a left subunit, and a right subunit that are adjacent to the first subunit includes:
  if the first subunit is included in the non-translational motion prediction unit, or the first subunit is a subunit adjacent to a lower boundary or a right boundary of the non-translational motion prediction unit, deriving, based on a preset non-translational motion model, the motion vector of each of the upper subunit, the lower subunit, the left subunit, and the right subunit that are adjacent to the first subunit; or
  if the first subunit is a subunit adjacent to an upper boundary of the non-translational motion prediction unit, deriving, based on a preset non-translational motion model, motion vectors of three subunits: the lower subunit, the left subunit, and the right subunit that are adjacent to the first subunit; and if a motion vector of a prediction unit in which the upper subunit adjacent to the first subunit is located exists, using a motion vector of the first subunit as a motion vector of the upper subunit; or if an intra-frame coding mode is used for the first subunit or a motion vector of the first subunit does not exist, deriving a motion vector of the upper subunit by using the preset non-translational motion model; or
  if the first subunit is a subunit adjacent to a left boundary of the non-translational motion prediction unit, deriving, based on a preset non-translational motion model, motion vectors of three subunits: the lower subunit, the upper subunit, and the right subunit that are adjacent to the first subunit; and if a motion vector of a prediction unit in which the left subunit adjacent to the first subunit is located exists, using a motion vector of the first subunit as a motion vector of the left subunit; or if an intra-frame coding mode is used for the first subunit or a motion vector of the first subunit does not exist, deriving a motion vector of the left subunit by using the preset non-translational motion model.

Optionally, in still another implementable manner of the first aspect, the obtaining a first pixel value of a first subunit adjacent to the filtering boundary may further include:
  obtaining a first predicted pixel value of the first subunit (P);
  deriving, based on a preset non-translational motion model, motion vectors of M sets of coordinates in upper coordinates (1.1), lower coordinates (1.2), left coordinates (1.3), and right coordinates (1.4) that are adjacent to a first vertex (1) of the first subunit (P), and motion vectors of M sets of coordinates in upper coordinates (2.1), lower coordinates (2.2), left coordinates (2.3), and right coordinates (2.4) that are adjacent to a second vertex (2) of the first subunit (P), where the first vertex (1) and the second vertex (2) are any two different vertexes of the first subunit (P), and M is any integer ranging from 1 to 4;
  obtaining M motion vector pairs by grouping the motion vectors of the M sets of coordinates in the upper coordinates (1.1), the lower coordinates (1.2), the left coordinates (1.3), and the right coordinates (1.4) that are adjacent to the first vertex (1) of the first subunit (P), and the motion vectors of the M sets of coordinates in the upper coordinates (2.1), the lower coordinates (2.2), the left coordinates (2.3), and the right coordinates (2.4) that are adjacent to the second vertex (2) of the first subunit (P), where a first motion vector pair in the M motion vector pairs includes a motion vector of first coordinates adjacent to the first vertex (1) of the first subunit (P) and a motion vector of first coordinates adjacent to the second vertex (2) of the first subunit (P), and the first coordinates are upper coordinates or lower coordinates or left coordinates or right coordinates;
  separately performing calculation on the M motion vector pairs based on the preset non-translational motion model, to obtain M motion vectors of the first subunit (P);
  obtaining M second predicted pixel values of the first subunit (P) based on the M motion vectors of the first subunit (P); and
  obtaining the first pixel value of the first subunit (P) based on the first predicted pixel value of the first subunit (P) and the M second predicted pixel values by using a first preset algorithm.

In this way, considering a correlation of motion vectors of different subunits, motion compensation is performed on the first subunit based on a motion vector of a subunit adjacent to the first subunit, or the motion vector of the first unit is calculated based on a coordinate point adjacent to the first subunit, to perform motion compensation on the first subunit. Therefore, data redundancy and a data coding length are reduced, and prediction precision of the first subunit is improved.

Optionally, in still another implementable manner of the first aspect, the performing, based on the first pixel value of the first subunit and the first pixel value of the second subunit, filtering processing on pixels adjacent to the filtering boundary may include:
  determining a boundary strength value of the filtering boundary;
  obtaining, based on the boundary strength value of the filtering boundary, initial thresholds $\beta_0$ and $t_0$, a quantization parameter of the first subunit, and a quantization parameter of the second subunit, thresholds β and t corresponding to the filtering boundary; and performing, based on β, t, and pixel differences between pixel values of M pixels that are adjacent to the filtering boundary and that are in the first subunit and the second subunit, filtering processing on the pixels adjacent to the filtering boundary, where M is an integer greater than or equal to 1.

In this way, filtering processing can be performed, based on strength of the filtering boundary, on the pixels adjacent to the filtering boundary, to reduce a blocking artifact caused by division of the transform unit and the prediction unit.

According to a second aspect, an embodiment of the present invention further provides a filtering apparatus, configured to perform the method described in the first aspect. The filtering apparatus may include:

a division unit, configured to divide each prediction unit into at least two subunits, where each subunit includes N×N pixels, and N is an integer greater than or equal to 1;

a determining unit, configured to: traverse each of the at least two subunits obtained by the division unit through division, and determine at least one filtering boundary of the at least two subunits based on a preset rule;

an obtaining unit, configured to: for any one of the at least one filtering boundary determined by the determining unit, obtain a first pixel value of a first subunit and a first pixel value of a second subunit, where the first subunit and the second subunit are adjacent to the filtering boundary; and a filtering unit, configured to perform, based on the first pixel value of the first subunit and the first pixel value of the second subunit that are obtained by the obtaining unit, filtering processing on pixels adjacent to the filtering boundary.

When the filtering boundary is horizontal, the first subunit is an upper subunit adjacent to the filtering boundary, and the second subunit is a lower subunit adjacent to the filtering boundary; or when the filtering boundary is vertical, the first subunit is a left subunit adjacent to the filtering boundary, and the second subunit is a right subunit adjacent to the filtering boundary.

In this way, all filtering boundaries in the prediction unit are determined, and filtering processing is performed on pixels adjacent to the filtering boundaries, so that a "blocking artifact" between unit blocks with different motion vectors is removed, and prediction precision and subjective quality of an image are improved.

Optionally, in an implementable manner of the second aspect, for any one of the at least two subunits, the determining unit is specifically configured to:

if the subunit is included in the non-translational motion prediction unit, determine each boundary of the subunit as a filtering boundary; or if a first boundary of the subunit is a sub-block boundary of the prediction unit in the image block or a first boundary of the subunit is a sub-block boundary of the transform unit in the image block, determine the first boundary of the subunit as a filtering boundary, where the first boundary is any boundary of the subunit.

In this way, not only a boundary that is in the prediction unit and that is located on the sub-block boundary of the prediction unit or the sub-block boundary of the transform unit is determined as a filtering boundary, and subsequent filtering processing is performed on the boundary, but also a boundary of the non-translational motion prediction unit can be determined as a filtering boundary, and filtering processing is performed on the boundary of the non-translational motion prediction unit in the prediction unit, so that a blocking artifact between non-translational motion prediction units in the prediction unit is removed.

Optionally, in another implementable manner of the second aspect, the obtaining unit may be specifically configured to:

obtain a first predicted pixel value of the first subunit;

calculate motion vectors of M subunits in an upper subunit, a lower subunit, a left subunit, and a right subunit that are adjacent to the first subunit, where M is any integer ranging from 1 to 4;

obtain M second predicted pixel values of the first subunit based on the motion vectors of the M subunits; and obtain the first pixel value of the first subunit based on the first predicted pixel value of the first subunit and the M second predicted pixel values by using a first preset algorithm.

The obtaining unit is specifically configured to:

if the first subunit is included in the non-translational motion prediction unit, or the first subunit is a subunit adjacent to a lower boundary or a right boundary of the non-translational motion prediction unit, derive, based on a preset non-translational motion model, a motion vector of each of the upper subunit, the lower subunit, the left subunit, and the right subunit that are adjacent to the first subunit; or if the first subunit is a subunit adjacent to an upper boundary of the non-translational motion prediction unit, derive, based on a preset non-translational motion model, motion vectors of three subunits: the lower subunit, the left subunit, and the right subunit that are adjacent to the first subunit; and if a motion vector of a prediction unit in which the upper subunit adjacent to the first subunit is located exists, use a motion vector of the first subunit as a motion vector of the upper subunit; or if an intra-frame coding mode is used for the first subunit or a motion vector of the first subunit does not exist, derive a motion vector of the upper subunit by using the preset non-translational motion model; or if the first subunit is a subunit adjacent to a left boundary of the non-translational motion prediction unit, derive, based on a preset non-translational motion model, motion vectors of three subunits: the lower subunit, the upper subunit, and the right subunit that are adjacent to the first subunit; and if a motion vector of a prediction unit in which the left subunit adjacent to the first subunit is located exists, use a motion vector of the first subunit as a motion vector of the left subunit; or if an intra-frame coding mode is used for the first subunit or a motion vector of the first subunit does not exist, derive a motion vector of the left subunit by using the preset non-translational motion model.

Optionally, in still another implementable manner of the second aspect, the obtaining unit may be further specifically configured to:

obtain a first predicted pixel value of the first subunit (P);

derive, based on a preset non-translational motion model, motion vectors of M sets of coordinates in upper coordinates (1.1), lower coordinates (1.2), left coordinates (1.3), and right coordinates (1.4) that are adjacent to a first vertex (1) of the first subunit (P), and motion vectors of M sets of coordinates in upper coordinates (2.1), lower coordinates (2.2), left coordinates (2.3), and right coordinates (2.4) that are adjacent to a second vertex (2) of the first subunit (P), where the first vertex (1) and the second vertex (2) are any two different vertexes of the first subunit (P), and M is any integer ranging from 1 to 4;

obtain M motion vector pairs by grouping the motion vectors of the M sets of coordinates in the upper coordinates (1.1), the lower coordinates (1.2), the left coordinates (1.3), and the right coordinates (1.4) that are adjacent to the first vertex (1) of the first subunit (P), and the motion vectors of the M sets of coordinates in the upper coordinates (2.1), the lower coordinates (2.2), the left coordinates (2.3), and the right coordinates (2.4) that are adjacent to the second vertex (2) of the first subunit (P), where a first motion vector pair in the M motion vector pairs includes a motion vector of first coordinates adjacent to the first vertex (1) of the first subunit (P) and a motion vector of first coordinates adjacent to the second vertex (2) of the first subunit (P), and the first coordinates are upper coordinates or lower coordinates or left coordinates or right coordinates;

separately perform calculation on the M motion vector pairs based on the preset non-translational motion model, to obtain M motion vectors of the first subunit (P);

obtain M second predicted pixel values of the first subunit (P) based on the M motion vectors of the first subunit (P); and obtain the first pixel value of the first subunit (P) based on the first predicted pixel value of the first subunit (P) and the M second predicted pixel values by using a first preset algorithm.

In this way, considering a correlation of motion vectors of different subunits, motion compensation is performed on the first subunit based on a motion vector of a subunit adjacent to the first subunit, or the motion vector of the first unit is calculated based on a coordinate point adjacent to the first subunit, to perform motion compensation on the first subunit. Therefore, data redundancy and a data coding length are reduced, and prediction precision of the first subunit is improved.

Optionally, in still another implementable manner of the second aspect, the determining unit is further configured to determine a boundary strength value of the filtering boundary; and the filtering unit is specifically configured to: obtain, based on the boundary strength value of the filtering boundary, initial thresholds $\beta_0$ and $t_0$, a quantization parameter of the first subunit, and a quantization parameter of the second subunit, thresholds $\beta$ and t corresponding to the filtering boundary; and perform, based on $\beta$, t, and pixel differences between pixel values of M pixels that are adjacent to the filtering boundary and that are in the first subunit and the second subunit, filtering processing on the pixels adjacent to the filtering boundary, where M is an integer greater than or equal to 1.

In this way, filtering processing can be performed, based on strength of the filtering boundary, on the pixels adjacent to the filtering boundary, to reduce a blocking artifact caused by division of the transform unit and the prediction unit.

It should be noted that the function modules described in the second aspect may be implemented by using hardware, or may be implemented by hardware by executing corresponding software. The hardware or the software includes one or more modules corresponding to the foregoing functions, for example, a communications unit, configured to communicate with an external network element; a processor, configured to implement functions of the division unit, the determining unit, the obtaining unit, and the filtering unit; and a memory, configured to store a corresponding application program. The processor, the communications unit, and the memory are connected by using a bus and communicate with each other. Specific implementations are as follows:

According to a third aspect, an embodiment of the present invention further provides a filtering apparatus, configured to perform the method described in the first aspect. The filtering apparatus may include:

a division unit, configured to divide each prediction unit into at least two subunits, where each subunit includes N×N pixels, and N is an integer greater than or equal to 1;

a determining unit, configured to: traverse each of the at least two subunits obtained by the division unit through division, and determine at least one filtering boundary of the at least two subunits based on a preset rule;

an obtaining unit, configured to obtain a first pixel value of a first subunit and a first pixel value of a second subunit, where the first subunit and the second subunit are adjacent to the filtering boundary; and a filtering unit, configured to perform, based on the first pixel value of the first subunit and the first pixel value of the second subunit that are obtained by the obtaining unit, filtering processing on pixels adjacent to the filtering boundary.

Specifically, for functions performed by the processor, refer to the functions performed by the division unit, the determining unit, the obtaining unit and the filtering unit in the filtering apparatus provided in the second aspect.

It can be learned from above that the embodiments of the present invention provide a filtering method for removing a blocking artifact and a filtering apparatus. Each prediction unit is divided into the at least two subunits. Each of the at least two subunits obtained by the division unit through division is traversed, and the at least one filtering boundary of the at least two subunits is determined based on the preset rule. The first pixel value of the first subunit and the first pixel value of the second subunit are obtained, where the first subunit and the second subunit are adjacent to the filtering boundary. Filtering processing is performed, based on the first pixel value of the first subunit and the first pixel value of the second subunit, on the pixels adjacent to the filtering boundary. In this way, not only pixels in units in the prediction unit that are located on two sides of the sub-block boundary of the prediction unit or the sub-block boundary of the transform unit are filtered, but also filtering processing can be performed on a boundary of the non-translational motion prediction unit in the prediction unit, so that a blocking artifact in the prediction unit is removed, and prediction precision and subjective quality of an image are improved, avoiding a problem that a blocking artifact cannot be removed because a filtering operation is performed only on an upper boundary and a left boundary of a prediction unit, and no filtering processing is performed on a boundary of an internal motion compensation block of the prediction unit.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

A main principle of the present invention is as follows: Not only pixels in units in a prediction unit that are located on two sides of a sub-block boundary of the prediction unit or a sub-block boundary of a transform unit are filtered, but also a non-translational motion prediction unit is found and filtering processing is performed on a boundary of the non-translational motion prediction unit in the prediction unit, so that a blocking artifact in the prediction unit is removed, and prediction precision and subjective quality of an image are improved, avoiding a problem that a blocking artifact cannot be removed because a filtering operation is performed only on an upper boundary and a left boundary of a prediction unit on which motion compensation is performed by using a non-translational motion model, and no filtering processing is performed on a boundary of an internal motion compensation block of the prediction unit. Therefore, prediction precision and subjective quality of an image are improved.

It should be noted that, the terms "first", "second", "third", "fourth", and the like (if existent) in the specification, claims, and accompanying drawings of the present invention are intended to distinguish between similar objects but do not necessarily indicate a specific order. It should be understood that the data termed in such a way is interchangeable in proper circumstances, so that the embodiments of the present invention described herein can be implemented in an order different from the order illustrated or described herein. In addition, directions or positional relations indicated by terms "center", "up", "down", "left", "right", "top", "bottom", "inside", "outside", and the like are directions or positional relations that are shown based on the accompanying drawings, and are merely used to describe the present invention easily and simplify the description, rather than indicate or imply that an indicated system or component needs to have a specific orientation or needs to be constructed and operated in the specific orientation, and therefore cannot be understood as a limitation on the present invention.

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1:
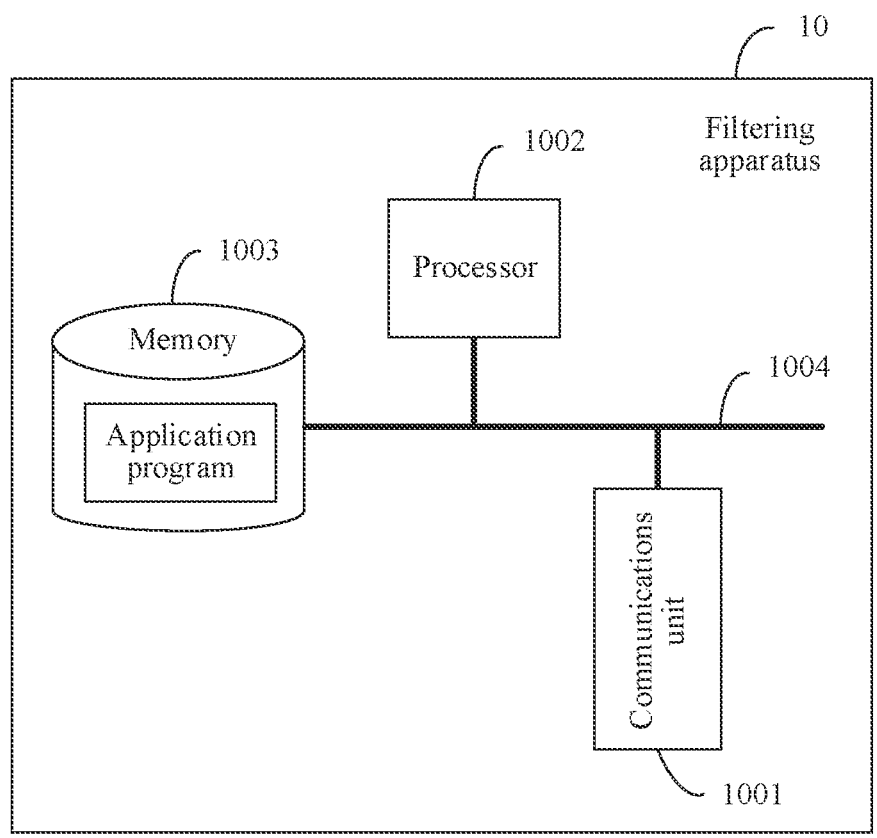
FIG. 1 is a structural diagram of a filtering apparatus according to an embodiment of the present invention.

FIG. 1 is a structural diagram of a filtering apparatus that can perform a method provided in the present invention. The filtering apparatus is configured to perform filtering processing on an image block. The image block is divided into at least one prediction unit, at least one non-translational motion prediction unit, and at least one transform unit. The prediction unit includes a non-translational motion prediction unit. The filtering apparatus may be a video coding apparatus or a video decoding apparatus. The video coding apparatus or the video decoding apparatus may be any apparatus that needs to output or store a video, for example, a notebook computer, a tablet computer, a personal computer, a mobile phone, or a video server. Referring to FIG. 1, the filtering apparatus may include a communications interface 1001, a processor 1002, a memory 1003, and at least one communications bus 1004, configured to implement connections and mutual communication between these components.

The communications interface 1001 may be configured to perform data communication with an external network element.

The processor 1002 may be a central processing unit (CPU for short), or may be an application-specific integrated circuit (ASIC), or one or more integrated circuits configured to implement this embodiment of the present invention, for example, one or more microprocessors (DSP) or one or more field programmable gate arrays (FPGA).

The memory 1003 may be a volatile memory, such as a random access memory (RAM); or a non-volatile memory, such as a read-only memory (ROM), a flash memory, a hard disk drive (HDD), or a solid-state drive (SSD); or a combination of the foregoing types of memories, and is configured to store an application program that can implement a filtering method provided in the present invention.

The communications bus 1004 may be classified into an address bus, a data bus, a control bus, and the like, and may be an Industry Standard Architecture (ISA) bus, a Peripheral Component Interconnect (PCI) bus, an Extended Industry Standard Architecture (EISA) bus, or the like. For ease of denotation, the communications bus is represented by using only one bold line in FIG. 1, but it does not indicate that there is only one bus or only one type of bus.

Specifically, the processor 1002 is configured to:
divide each prediction unit into at least two subunits, where each subunit includes N×N pixels, and N is an integer greater than or equal to 1;
traverse each of the at least two subunits, and determine at least one filtering boundary of the at least two subunits based on a preset rule;
obtain a first pixel value of a first subunit and a first pixel value of a second subunit, where the first subunit and the second subunit are adjacent to the filtering boundary; and
perform, based on the first pixel value of the first subunit and the first pixel value of the second subunit, filtering processing on pixels adjacent to the filtering boundary.

When the filtering boundary is horizontal, the first subunit is an upper subunit adjacent to the filtering boundary, and the second subunit is a lower subunit adjacent to the filtering boundary; or
when the filtering boundary is vertical, the first subunit is a left subunit adjacent to the filtering boundary, and the second subunit is a right subunit adjacent to the filtering boundary.

For any one of the at least two subunits, if the subunit is included in the non-translational motion prediction unit, each boundary of the subunit is determined as a filtering boundary; or if a first boundary of the subunit is a sub-block boundary of the prediction unit in the image block or a first boundary of the subunit is a sub-block boundary of the transform unit in the image block, the first boundary of the subunit is determined as a filtering boundary, where the first boundary is any boundary of the subunit.

Optionally, the processor 1002 may be configured to:

obtain a first predicted pixel value of the first subunit;

calculate motion vectors of M subunits in an upper subunit, a lower subunit, a left subunit, and a right subunit that are adjacent to the first subunit;

obtain M second predicted pixel values of the first subunit based on the motion vectors of the M subunits; and separately weight the first predicted pixel value of the first subunit and the M second predicted pixel values, and average results after the weighting to obtain the first pixel value of the first subunit, where M is any integer ranging from 1 to 4.

That the processor 1002 calculates a motion vector of each of an upper subunit, a lower subunit, a left subunit, and a right subunit that are adjacent to the first subunit may be:

if the first subunit is included in the non-translational motion prediction unit, or the first subunit is a subunit adjacent to a lower boundary or a right boundary of the non-translational motion prediction unit, deriving, based on a preset non-translational motion model, the motion vector of each of the upper subunit, the lower subunit, the left subunit, and the right subunit that are adjacent to the first subunit; or if the first subunit is a subunit adjacent to an upper boundary of the non-translational motion prediction unit, deriving, based on a preset non-translational motion model, motion vectors of three subunits: the lower subunit, the left subunit, and the right subunit that are adjacent to the first subunit; and if a motion vector of a prediction unit in which the upper subunit adjacent to the first subunit is located exists, using a motion vector of the first subunit as a motion vector of the upper subunit; or if an intra-frame coding mode is used for the first subunit or a motion vector of the first subunit does not exist, deriving a motion vector of the upper subunit by using the preset non-translational motion model; or if the first subunit is a subunit adjacent to a left boundary of the non-translational motion prediction unit, deriving, based on a preset non-translational motion model, motion vectors of three subunits: the lower subunit, the upper subunit, and the right subunit that are adjacent to the first subunit; and if a motion vector of a prediction unit in which the left subunit adjacent to the first subunit is located exists, using a motion vector of the first subunit as a motion vector of the left subunit; or if an intra-frame coding mode is used for the first subunit or a motion vector of the first subunit does not exist, deriving a motion vector of the left subunit by using the preset non-translational motion model.

Optionally, the processor 1002 may be further configured to:

obtain a first predicted pixel value of the first subunit;

derive, based on a preset non-translational motion model, motion vectors of M sets of coordinates in upper coordinates, lower coordinates, left coordinates, and right coordinates that are adjacent to a first vertex of the first subunit, and motion vectors of M sets of coordinates in upper coordinates, lower coordinates, left coordinates, and right coordinates that are adjacent to a second vertex of the first subunit, where the first vertex and the second vertex are any two different vertexes of the first subunit, and M is any integer ranging from 1 to 4;

obtain M motion vector pairs by grouping the motion vectors of the M sets of coordinates in the upper coordinates, the lower coordinates, the left coordinates, and the right coordinates that are adjacent to the first vertex of the first subunit, and the motion vectors of the M sets of coordinates in the upper coordinates, the lower coordinates, the left coordinates, and the right coordinates that are adjacent to the second vertex of the first subunit, where a first motion vector pair in the M motion vector pairs includes a motion vector of first coordinates adjacent to the first vertex of the first subunit and a motion vector of first coordinates adjacent to the second vertex of the first subunit, and the first coordinates are upper coordinates or lower coordinates or left coordinates or right coordinates;

separately perform calculation on the M motion vector pairs based on the preset non-translational motion model, to obtain M motion vectors of the first subunit;

obtain M second predicted pixel values of the first subunit based on the M motion vectors of the first subunit; and obtain the first pixel value of the first subunit based on the first predicted pixel value of the first subunit and the M second predicted pixel values by using a first preset algorithm.

Optionally, the processor 1002 may be further configured to:

determine a boundary strength value of the filtering boundary; and perform, based on the boundary strength value of the filtering boundary, initial thresholds $\beta_0$ and $t_0$, and pixel differences between pixel values of M pixels that are adjacent to the filtering boundary and that are in the first subunit and the second subunit, filtering processing on the pixels adjacent to the filtering boundary.

It can be learned from above that the filtering apparatus provided in this embodiment of the present invention divides each prediction unit into the at least two subunits; traverses each of the at least two subunits obtained by the processor through division, and determines the at least one filtering boundary of the at least two subunits based on the preset rule; obtains the first pixel value of the first subunit and the first pixel value of the second subunit, where the first subunit and the second subunit are adjacent to the filtering boundary; and performs, based on the first pixel value of the first subunit and the first pixel value of the second subunit, filtering processing on the pixels adjacent to the filtering boundary. In this way, not only pixels in units in the prediction unit that are located on two sides of the sub-block boundary of the prediction unit or the sub-block boundary of the transform unit are filtered, but also filtering processing can be performed on a boundary of the non-translational motion prediction unit in the prediction unit, so that a blocking artifact in the prediction unit is removed, and prediction precision and subjective quality of an image are improved, avoiding a problem that a blocking artifact cannot be removed because a filtering operation is performed only on an upper boundary and a left boundary of a prediction unit, and no filtering processing is performed on a boundary of an internal motion compensation block of the prediction unit.

For ease of description, Embodiment 1 shows and describes in detail, in a form of steps, a filtering method for removing a blocking artifact provided in the present invention. The shown steps may also be performed in, for example, a computer system including a set of executable instructions other than the apparatus shown in FIG. 1. In addition, although a logical order is shown in the figure, the shown or described steps may be performed in a different order in some cases.

Embodiment 1

Figure 2:
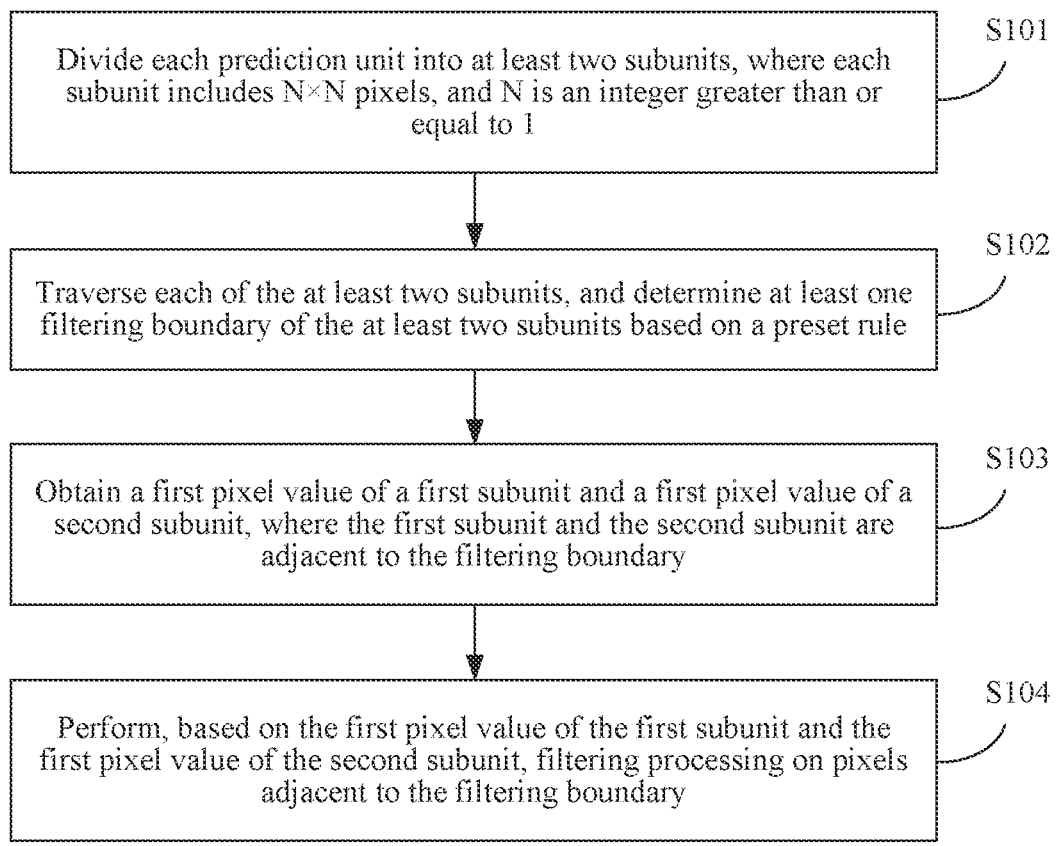
FIG. 2 is a flowchart of a filtering method for removing a blocking artifact according to an embodiment of the present invention.

FIG. 2 is a flowchart of a filtering method for removing a blocking artifact according to an embodiment of the present invention. The method is performed by the filtering apparatus shown in FIG. 1, and is used to perform filtering processing on an image block. The image block is divided into at least one prediction unit and at least one transform unit. The prediction unit includes a non-translational motion prediction unit.

The image block may be a coding image block, or may be a decoding image block. When the filtering apparatus is a video coding apparatus, the image block is a coding image block. When the filtering apparatus is a video decoding apparatus, the image block is a decoding image block.

In the High Efficiency Video Coding (HEVC) standard, a size of an image block may fall into four levels: 64×64, 32×32, 16×16, and 8×8. An image block of each level may be divided into prediction units of different sizes based on intra-frame prediction and inter-frame prediction. Each prediction unit may be classified into a translational motion prediction unit and a non-translational motion prediction unit based on translational motion model-based motion compensation prediction and non-translational motion model-based motion compensation prediction. The image block of each level may be divided into transform units of different sizes based on different transform modes.

It should be noted that a non-translational motion described in the present invention may include any irregular motion such as an affine motion, a scale motion, a rotational motion, or a perspective motion. That the prediction unit includes a non-translational motion prediction unit means that a prediction unit intersects with a non-translational motion prediction unit. Optionally, the prediction unit may include a translational motion prediction unit and a non-translational motion prediction unit.

Figure 3:
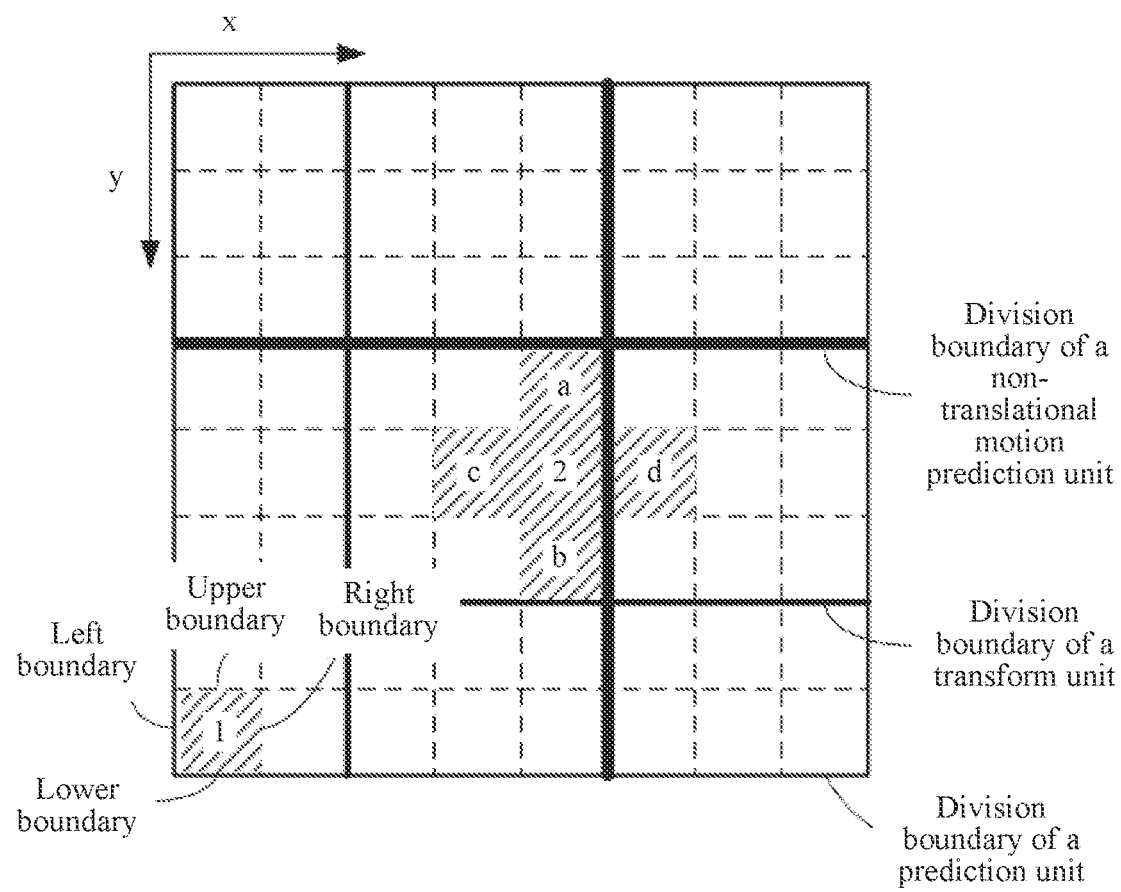
FIG. 3 is a schematic diagram of an image block according to an embodiment of the present invention.

For example, as shown in FIG. 3, if inter-frame prediction is performed for a 32×32 image block, the 32×32 image block may be independently used as one prediction unit. If motion compensation prediction is performed on the prediction unit by using a non-translational motion model, the prediction unit may be divided into non-translational motion prediction units of different sizes on a basis of each non-translational motion prediction unit. If different transform modes are used for units of different sizes in the 32×32 image block, the 32×32 image block may be divided into transform units of different sizes on a basis of each transform unit.

Motion vectors of adjacent units that are obtained based on a non-translational motion model are different. Therefore, to remove a blocking artifact between the adjacent units that are in the prediction unit on which motion compensation prediction is performed based on the non-translational motion model, a boundary between the adjacent units further needs to be found, so that filtering processing can be performed on a pixel near the boundary. As shown in FIG. 2, the method may include the following steps.

S101. Divide each prediction unit into at least two subunits, where each subunit includes N×N pixels, and N is an integer greater than or equal to 1.

A value of N may be set as required, and this is not limited in this embodiment of the present invention. Optionally, N is 4 by default.

For example, a w×h prediction unit may be divided into a plurality of 4×4 subunits. In this embodiment of the present invention, the 4×4 subunit may represent a subunit that includes 4×4 pixels.

S102. Traverse each of the at least two subunits, and determine at least one filtering boundary of the at least two subunits based on a preset rule.

Optionally, for any one of the at least two subunits, the determining a filtering boundary of the subunit based on a preset rule may include:

if the subunit is included in the non-translational motion prediction unit, determining each boundary of the subunit as a filtering boundary; or if a first boundary of the subunit is a sub-block boundary of the prediction unit in the image block or a first boundary of the subunit is a sub-block boundary of the transform unit in the image block, determining the first boundary of the subunit as a filtering boundary, where the first boundary is any boundary of the subunit.

In this way, not only pixels in the prediction unit that are located on the sub-block boundary of the prediction unit or the sub-block boundary of the transform unit are found, but also a boundary between adjacent units that are in the prediction unit on which motion compensation prediction is performed based on the non-translational motion model can be obtained.

For example, as shown in FIG. 3, a 32×32 prediction unit may be divided into 64 4×4 subunits (as shown by a shadow 1 in FIG. 3). Each subunit may include four boundaries: an upper boundary, a lower boundary, a left boundary, and a right boundary. A subunit shown by a shadow 2 in FIG. 3 is an internal subunit of the prediction unit. Because motion compensation prediction is performed by using the non-translational motion model, a motion vector of the subunit is different from those of its adjacent subunits. Because the subunit is an internal subunit of the prediction unit, if an existing filtering manner is used, no filtering processing is performed on the subunit, and consequently a "blocking artifact" between the subunit and its adjacent subunits is not removed. However, a boundary of the subunit may be determined as a filtering boundary in step S102, and filtering processing may be performed on a pixel near the boundary of the subunit through processing in subsequent steps, to remove the "blocking artifact" between the subunit and its adjacent subunits as much as possible, thereby implementing filtering processing on the internal subunit of the prediction unit and improving subjective and objective quality of a video image.

It should be noted that the upper, lower, left, and right boundaries of the subunit shown in FIG. 3 are merely examples for description, and the boundaries of the subunit include but are not limited to a naming manner in this example.

S103. Obtain a first pixel value of a first subunit and a first pixel value of a second subunit, where the first subunit and the second subunit are adjacent to the filtering boundary.

When the filtering boundary is horizontal, the first subunit is an upper subunit adjacent to the filtering boundary, and the second subunit is a lower subunit adjacent to the filtering boundary; or when the filtering boundary is vertical, the first subunit is a left subunit adjacent to the filtering boundary, and the second subunit is a right subunit adjacent to the filtering boundary.

It should be noted that the vertical filtering boundary is a sub-block boundary of a transform unit or a non-translational motion prediction unit in which sub-blocks of the transform unit or the non-translational motion prediction unit are horizontally placed, and the horizontal filtering boundary is a sub-block boundary of a transform unit or a non-translational motion prediction unit in which sub-blocks of the transform unit or the non-translational motion prediction unit are vertically placed. It may be understood that in the present invention, the image block is a plane including an x-axis (namely, a horizontal direction) and a y-axis (a vertical direction). Therefore, "horizontal" means being parallel with the x-axis and "vertical" means being parallel with the y-axis. For example, as shown in FIG. 3, a sub-block boundary of a transform unit is a vertical filtering boundary, in which sub-blocks of the transform unit are placed parallel with the x-axis.

For example, the first pixel value of the first subunit or the second subunit may be obtained in the following manner 1 or manner 2. Because a manner of obtaining the first pixel value of the first subunit is the same as that of obtaining the first pixel value of the second subunit, for ease of description, only obtaining the first pixel value of the first subunit is used as an example to describe the manner 1 or manner 2.

Manner 1: Obtain a first predicted pixel value of the first subunit;
  calculate motion vectors of M subunits in an upper subunit, a lower subunit, a left subunit, and a right subunit that are adjacent to the first subunit, where M is any integer ranging from 1 to 4;
  obtain M second predicted pixel values of the first subunit based on the motion vectors of the M subunits; and
  obtain the first pixel value of the first subunit based on the first predicted pixel value of the first subunit and the M second predicted pixel values by using a first preset algorithm.

It should be noted that in this embodiment of the present invention, the motion vector includes a horizontal component and a vertical component. The horizontal component is a component parallel with the x-axis, and the vertical component is a component parallel with the y-axis.

The first predicted pixel value of the first subunit may be an original pixel value that is derived based on a motion model. For example, when the first subunit is an affine motion unit, a motion vector of each pixel in the first subunit may be obtained based on the following affine motion model (1). Then each pixel in the first subunit is traversed to find, in a designated reference frame based on the motion vector of the pixel, a pixel that matches the pixel. A pixel value of the pixel in the reference frame is used as a predicted pixel value of the pixel in the first subunit. Predicted pixel values that are obtained by traversing all the pixels are combined into first predicted pixel values of the first subunit. It may be understood that if the first subunit includes N×N pixels, the obtained first predicted pixel values of the first subunit are an N×N matrix. In addition, an existing interpolation filtering algorithm may be used to find, in the designated reference frame based on the motion vector of the pixel, the pixel that matches the pixel, and this is not described in detail herein. It should be noted that in this embodiment of the present invention, the reference frame may be a forward reference frame, or may be a backward reference frame.

$$\begin{cases} v_X = \dfrac{v_{1x} - v_{0x}}{w}x - \dfrac{v_{1y} - v_{0y}}{w}y + v_{0x} \\ v_Y = \dfrac{v_{1y} - v_{0y}}{w}y - \dfrac{v_{1x} - v_{0x}}{w}y + v_{0y} \end{cases} \quad (1)$$

In the affine motion model (1), $(v_{0x}, v_{0y})$ may be usually a motion vector of a left vertex (0, 0) of the first subunit, $(v_{1x}, v_{1y})$ may be usually a motion vector of a right vertex (w, 0) of the first subunit, where w may be a width of the first subunit, and $(v_x, v_y)$ is a motion vector of a pixel (x, y) in the first subunit.

The upper subunit adjacent to the first subunit is a subunit adjacent to an upper boundary of the first subunit, the lower subunit adjacent to the first subunit is a subunit adjacent to a lower boundary of the first subunit, the left subunit adjacent to the first subunit is a subunit adjacent to a left boundary of the first subunit, and the right subunit adjacent to the first subunit is a subunit adjacent to a right boundary of the first subunit.

For example, as shown in FIG. 3, if the first subunit is a subunit 2, a subunit a is the upper subunit of the first subunit, a subunit b is the lower subunit of the first subunit, a subunit c is the left subunit of the first subunit, and a subunit d is the right subunit of the first subunit.

Optionally, the calculating motion vectors of M subunits in an upper subunit, a lower subunit, a left subunit, and a right subunit that are adjacent to the first subunit may include:
  if the first subunit is included in the non-translational motion prediction unit, or the first subunit is a subunit adjacent to a lower boundary or a right boundary of the non-translational motion prediction unit, deriving, based on a preset non-translational motion model, the motion vectors of the M subunits in the upper subunit, the lower subunit, the left subunit, and the right subunit that are adjacent to the first subunit; or
  if the first subunit is a subunit adjacent to an upper boundary of the non-translational motion prediction unit, deriving, based on a preset non-translational motion model, motion vectors of three subunits: the lower subunit, the left subunit, and the right subunit that are adjacent to the first subunit; and if a motion vector of a prediction unit in which the upper subunit adjacent to the first subunit is located exists, using a motion vector of the first subunit as a motion vector of the upper subunit; or if an intra-frame coding mode is used for the first subunit or a motion vector of the first subunit does not exist, deriving a motion vector of the upper subunit by using the preset non-translational motion model; or
  if the first subunit is a subunit adjacent to a left boundary of the non-translational motion prediction unit, deriving, based on a preset non-translational motion model, motion vectors of three subunits: the lower subunit, the upper subunit, and the right subunit that are adjacent to the first subunit; and if a motion vector of a prediction unit in which the left subunit adjacent to the first subunit is located exists, using a motion vector of the first subunit as a motion vector of the left subunit; or if an intra-frame coding mode is used for the first subunit or a motion vector of the first subunit does not exist, deriving a motion vector of the left subunit by using the preset non-translational motion model.

In this embodiment of the present invention, the non-translational motion may be any irregular motion such as an affine motion, a scale motion, a rotational motion, or a perspective motion. Therefore, corresponding to different non-translational motions, the deriving a motion vector of the subunit by using the preset non-translational motion model may include:

deriving the motion vector of the subunit based on the affine motion model (1); or deriving the motion vector of the subunit based on a scale motion model (2):

$$\begin{cases} v_x = a_0 x + v_{0x} \\ v_y = a_1 y + v_{0y} \end{cases} \quad (2)$$

where in the scale motion model (2), $(v_{0x}, v_{0y})$ may be usually a motion vector of a left vertex (0, 0) of the first subunit, $(\alpha_0, \alpha_1)$ is a set of preset scale factors, $\alpha_0$ is a scale factor in the horizontal direction, $\alpha_1$ is a scale factor in the vertical direction, and $(v_x, v_y)$ is a motion vector of a pixel (x, y) in the first subunit; or deriving the motion vector of the subunit based on a rotational motion model (3):

$$\begin{cases} v_x = (1 - \cos\theta)x - \sin\theta y + v_{0x} \\ v_y = \sin\theta x + (1 - \cos\theta)y + v_{0y} \end{cases} \quad (3)$$

where in the rotational motion model (3), $(v_{0x}, v_{0y})$ may be usually a motion vector of a left vertex (0, 0) of the first subunit, and $(v_x, v_y)$ is a motion vector of a pixel (x, y) in the first subunit; or deriving the motion vector of the subunit based on a perspective motion model (4):

$$\begin{cases} v_X = \dfrac{v_{1x} - v_{0x}}{w} x + \dfrac{v_{2x} - v_{0x}}{h} y + \dfrac{v_{3x} + v_{0x} - v_{1x} - v_{2x}}{wh} x + v_{0x} \\ v_y = \dfrac{v_{1y} - v_{0y}}{w} x + \dfrac{v_{2y} - v_{0y}}{h} y + \dfrac{v_{3y} + v_{0y} - v_{1y} - v_{2y}}{wh} xy + v_{0y} \end{cases} \quad (4)$$

where in the perspective motion model (4), $(v_{0x}, v_{0y})$ may be usually a motion vector of a left vertex (0, 0) of the first subunit, $(v_{1x}, v_{1y})$ may be usually a motion vector of a right vertex (w, 0) of the first subunit, $(v_{2x}, v_{2y})$ may be usually a motion vector of a lower left vertex (0, h) of the first subunit, $(v_{x3}, v_{3y})$ may be usually a motion vector of a lower right vertex (w, h) of the first subunit, where w may be a width of the first subunit, and h is a height of the first subunit, and $(v_x, v_y)$ is a motion vector of a pixel (x, y) in the first subunit.

The second predicted pixel value may be a new pixel value that is obtained by performing motion compensation on the first subunit by using a subunit adjacent to the first subunit.

Optionally, when M is 4, the obtaining M second predicted pixel values of the first subunit based on the motion vectors of the M subunits may include:

performing motion compensation on the first subunit based on the motion vector of the upper subunit adjacent to the first subunit, to obtain one second predicted pixel value;

performing motion compensation on the first subunit based on a motion vector of the lower subunit adjacent to the first subunit, to obtain one second predicted pixel value;

performing motion compensation on the first subunit based on the motion vector of the left subunit adjacent to the first subunit, to obtain one second predicted pixel value; and performing motion compensation on the first subunit based on a motion vector of the right subunit adjacent to the first subunit, to obtain one second predicted pixel value.

It should be noted that an implementation of performing motion compensation on the first subunit based on the motion vector of the upper subunit adjacent to the first subunit, to obtain one second predicted pixel value is basically the same as that of performing motion compensation based on the lower subunit or the left subunit or the right subunit adjacent to the first subunit. For ease of description, herein only the implementation of performing motion compensation on the first subunit based on the motion vector of the upper subunit adjacent to the first subunit, to obtain one second predicted pixel value is used as an example for description.

For example, the motion vector of the upper subunit adjacent to the first subunit may be used as the motion vector of the first subunit, then a unit that matches the first subunit is found in the designated reference frame based on the motion vector, and a pixel value of the matched unit in the reference frame is used as a second predicted pixel value of the first subunit.

Optionally, the obtaining the first pixel value of the first subunit based on the first predicted pixel value of the first subunit and the M second predicted pixel values by using a first preset algorithm may include:

separately weighting the first predicted pixel value of the first subunit and the M second predicted pixel values, and averaging results after the weighting to obtain the first pixel value of the first subunit.

Specifically, the first predicted pixel value and each second predicted pixel value of the first subunit may be weighted first based on the following formula (5), to obtain M weighted pixel values, and the M weighted pixel values are averaged to obtain the first pixel value of the first subunit:

$$P'_C(i, j) = P_C(i, j) * W_M(i, j) + P_M(i, j) * W_M(i, j) \quad (5)$$

In the formula (5), $P_C(i, j)$ is the first predicted pixel value of the first subunit, $P_N(i, j)$ is the second predicted pixel value of the first subunit, $W_N(i, j)$ is a weighting matrix corresponding to the second predicted pixel value $P_N(i, j)$, $P'_C(i, j)$ is a pixel value that is obtained after weighting the first pixel value and the second predicted pixel value of the first subunit, and a value of M may range from 1 to 4.

For example, if the first subunit includes 4×4 pixels, the first predicted pixel values and the second predicted pixel values of the first subunit are both 4×4 matrices. Generally, weighting matrices $W_1$, $W_2$, $W_3$, and $W_4$ corresponding to predicted pixel values $P_1$, $P_2$, $P_3$, and $P_4$ that are obtained by performing motion compensation by using the four subunits: the upper, lower, left, and right subunits are:

$$W_1 = \begin{bmatrix} 3/4 & 3/4 & 3/4 & 3/4 \\ 7/8 & 7/8 & 7/8 & 7/8 \\ 1 & 1 & 1 & 1 \\ 1 & 1 & 1 & 1 \end{bmatrix},$$

$$W_2 = \begin{bmatrix} 1 & 1 & 1 & 1 \\ 1 & 1 & 1 & 1 \\ 7/8 & 7/8 & 7/8 & 7/8 \\ 3/4 & 3/4 & 3/4 & 3/4 \end{bmatrix},$$

-continued $$W_3 = \begin{bmatrix} 3/4 & 7/8 & 1 & 1 \\ 3/4 & 7/8 & 1 & 1 \\ 3/4 & 7/8 & 1 & 1 \\ 3/4 & 7/8 & 1 & 1 \end{bmatrix},$$

$$W_4 = \begin{bmatrix} 1 & 1 & 7/8 & 3/4 \\ 1 & 1 & 7/8 & 3/4 \\ 1 & 1 & 7/8 & 3/4 \\ 1 & 1 & 7/8 & 3/4 \end{bmatrix}.$$

Manner 2: Obtain a first predicted pixel value of the first subunit P;

derive, based on a preset non-translational motion model, motion vectors of M sets of coordinates in upper coordinates 1.1, lower coordinates 1.2, left coordinates 1.3, and right coordinates 1.4 that are adjacent to a first vertex 1 of the first subunit P, and motion vectors of M sets of coordinates in upper coordinates 2.1, lower coordinates 2.2, left coordinates 2.3, and right coordinates 2.4 that are adjacent to a second vertex 2 of the first subunit P, where M is any integer ranging from 1 to 4;

obtain M motion vector pairs by grouping the motion vectors of the M sets of coordinates in the upper coordinates 1.1, the lower coordinates 1.2, the left coordinates 1.3, and the right coordinates 1.4 that are adjacent to the first vertex 1 of the first subunit P, and the motion vectors of the M sets of coordinates in the upper coordinates 2.1, the lower coordinates 2.2, the left coordinates 2.3, and the right coordinates 2.4 that are adjacent to the second vertex 2 of the first subunit P, where a first motion vector pair in the M motion vector pairs includes a motion vector of first coordinates adjacent to the first vertex 1 of the first subunit P and a motion vector of first coordinates adjacent to the second vertex 2 of the first subunit P, and the first coordinates are upper coordinates or lower coordinates or left coordinates or right coordinates;

separately perform calculation on the M motion vector pairs based on the preset non-translational motion model, to obtain M motion vectors of the first subunit P;

obtain M second predicted pixel values of the first subunit P based on the M motion vectors of the first subunit P; and obtain the first pixel value of the first subunit P based on the first predicted pixel value of the first subunit P and the M second predicted pixel values by using a first preset algorithm.

The upper coordinates 1.1 adjacent to the first vertex 1 of the first subunit P may be coordinates of a first vertex of a subunit adjacent to an upper boundary of the first subunit. The lower coordinates 1.2 adjacent to the first vertex 1 of the first subunit P may be coordinates of a first vertex of a subunit adjacent to a lower boundary of the first subunit P. The left coordinates 1.3 adjacent to the first vertex of the first subunit P may be coordinates of a first vertex of a subunit adjacent to a left boundary of the first subunit. The right coordinates 1.4 adjacent to the first vertex of the first subunit P may be coordinates of a first vertex of a subunit adjacent to a right boundary of the first subunit.

The upper coordinates 2.1 adjacent to the second vertex 2 of the first subunit P may be coordinates of a second vertex of the subunit adjacent to the upper boundary of the first subunit. The lower coordinates 2.2 adjacent to the second vertex 2 of the first subunit P may be coordinates of a second vertex of the subunit adjacent to the lower boundary of the first subunit. The left coordinates 2.3 adjacent to the second vertex 2 of the first subunit P may be coordinates of a second vertex of the subunit adjacent to the left boundary of the first subunit. The right coordinates 2.4 adjacent to the second vertex 2 of the first subunit P may be coordinates of a second vertex of the subunit adjacent to the right boundary of the first subunit. It should be noted that in this embodiment of the present invention, a first vertex of a subunit may be any one of four vertexes: an upper left vertex, a lower left vertex, an upper right vertex, and a lower right vertex of the subunit, and a second vertex of the subunit may be any one of vertexes other than the first vertex in the four vertexes: the upper left vertex, the lower left vertex, the upper right vertex, and the lower right vertex of the subunit. A vertex of the subunit may be a coordinate point of a pixel at a position of the vertex. Generally, an upper left vertex of the first subunit P is set as an origin (0, 0), and coordinates of other vertexes are correspondingly set based on a position of the origin.

Figures 4, 5:
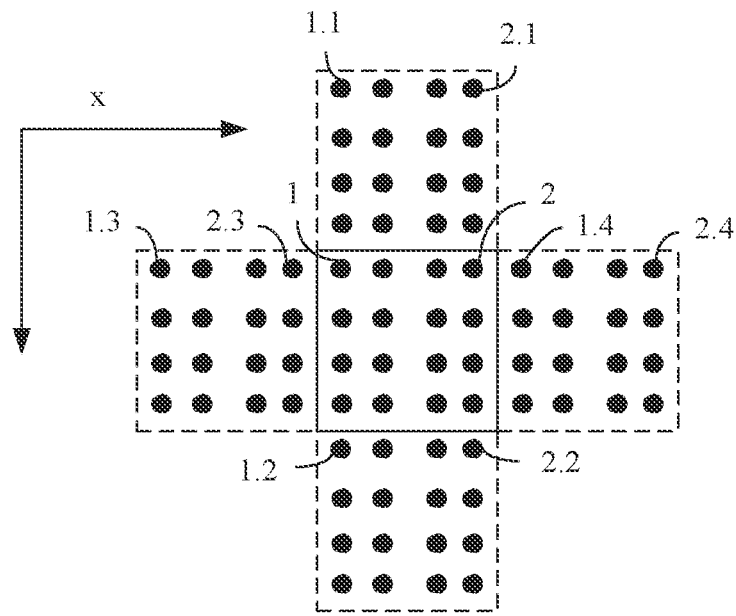
FIG. 4 is a schematic diagram of an image block according to an embodiment of the present invention.
FIG. 5 is a schematic diagram of an image block according to an embodiment of the present invention.

For example, as shown in FIG. 4, the first subunit P is a 4×4 subunit. 4×4 is a quantity of pixels, and a spacing between adjacent pixels in the horizontal direction or the vertical direction is 1. It is assumed that the first vertex 1 of the first subunit P is a pixel (0, 0) at the upper left vertex. The upper left vertex and an upper right vertex of the first subunit are spaced three pixels apart. Therefore, the second vertex 2 of the first subunit P is a pixel (3, 0) at the upper right vertex, the upper coordinates 1.1 adjacent to the first vertex 1 are a pixel (0, −4) at an upper left vertex of the upper subunit adjacent to the upper boundary of the first subunit P, the lower coordinates 1.2 adjacent to the first vertex 1 are a pixel (0, 4) at an upper left vertex of the lower subunit adjacent to the lower boundary of the first subunit P, the left coordinates 1.3 adjacent to the first vertex 1 are a pixel (−4, 0) at an upper left vertex of the left subunit adjacent to the left boundary of the first subunit P, and the right coordinates 1.4 adjacent to the first vertex 1 are a pixel (4, 0) at an upper left vertex of the right subunit adjacent to the right boundary of the first subunit P. Likewise, as shown in FIG. 4, the upper coordinates 2.1 adjacent to the second vertex 2 that is the pixel (3, 0) are a pixel (3, −4) at an upper right vertex of the upper subunit adjacent to the upper boundary of the first subunit P, the lower coordinates 2.2 adjacent to the second vertex 2 are a pixel (3, 4) at an upper right vertex of the lower subunit adjacent to the lower boundary of the first subunit P, the left coordinates 2.3 adjacent to the second vertex 2 are a pixel (−1, 0) at an upper right vertex of the left subunit adjacent to the left boundary of the first subunit P, and the right coordinates 2.4 adjacent to the second vertex 2 are a pixel (7, 0) at an upper right vertex of the right subunit adjacent to the right boundary of the first subunit P.

For example, when M=4, motion vectors of the four sets of coordinates: the upper coordinates, the lower coordinates, the left coordinates, and the right coordinates that are adjacent to the first vertex of the first subunit, and motion vectors of the four sets of coordinates: the upper coordinates, the lower coordinates, the left coordinates, and the right coordinates that are adjacent to the second vertex of the first subunit may be derived based on the preset non-translational motion model.

The first motion vector pair includes a motion vector of the upper coordinates adjacent to the first vertex of the first subunit and a motion vector of the upper coordinates adjacent to the second vertex of the first subunit. A second motion vector pair includes a motion vector of the lower coordinates adjacent to the first vertex of the first subunit and a motion vector of the lower coordinates adjacent to the second vertex of the first subunit. A third motion vector pair includes a motion vector of the left coordinates adjacent to the first vertex of the first subunit and a motion vector of the left coordinates adjacent to the second vertex of the first subunit. A fourth motion vector pair includes a motion vector of the right coordinates adjacent to the first vertex of the first subunit and a motion vector of the right coordinates adjacent to the second vertex of the first subunit.

Calculation is separately performed on the first motion vector pair, the second motion vector pair, the third motion vector pair, and the fourth motion vector pair based on the preset non-translational motion model, to obtain four motion vectors of the first subunit. Four second predicted pixel values of the first subunit are obtained based on the four motion vectors of the first subunit. The first predicted pixel value of the first subunit and the four second predicted pixel values are separately weighted. Results after the weighting are averaged to obtain the first pixel value of the first subunit.

A method for obtaining the first predicted pixel value of the first subunit in the manner 2 is the same as a method for obtaining the first predicted pixel value of the first subunit in the manner 1, and details are not described herein again.

In addition, in the manner 2, a manner in which the M second predicted pixel values of the first subunit are obtained based on the M motion vectors of the first subunit, the first predicted pixel value of the first subunit and the M second predicted pixel values are separately weighted, and the results after the weighting are averaged to obtain the first pixel value of the first subunit is also the same as that in the manner 1, and details are not described herein again.

It may be understood that the motion vectors of the upper, lower, left, and right coordinates that are adjacent to the first vertex or the second vertex of the first subunit may be derived based on the preset non-translational motion model (1) or (2) or (3) or (4).

S104. Perform, based on the first pixel value of the first subunit and the first pixel value of the second subunit, filtering processing on pixels adjacent to the filtering boundary.

Optionally, a boundary strength value of the filtering boundary may be set, and filtering processing may be performed, based on the boundary strength value of the filtering boundary, initial thresholds $\beta_0$ and $t_0$, and pixel differences between pixel values of M pixels that are adjacent to the filtering boundary and that are in the first subunit and the second subunit, on the pixels adjacent to the filtering boundary by using a second preset algorithm, where M is an integer greater than or equal to 1.

For example, thresholds $\beta$ and $t$ corresponding to the filtering boundary may be obtained based on the boundary strength value of the filtering boundary, the initial thresholds $\beta_0$ and $t_0$, a quantization parameter of the first subunit, and a quantization parameter of the second subunit.

Filtering processing is performed, based on $\beta$, $t$, and the pixel differences between the pixel values of the M pixels that are adjacent to the filtering boundary and that are in the first subunit and the second subunit, on the pixels adjacent to the filtering boundary, where M is an integer greater than or equal to 1.

The boundary strength value of the filtering boundary may be set in the following manner:

if at least one intra-frame prediction unit exists in the image block in which the first subunit or the second subunit is located, setting the boundary strength value of the filtering boundary to 2; or if no intra-frame prediction unit exists in the image block in which the first subunit or the second subunit is located, the filtering boundary is the sub-block boundary of the transform unit, and the transform unit in which the first subunit or the second subunit is located has at least one non-zero coefficient, setting the boundary strength value of the filtering boundary to 1; or if no intra-frame prediction unit exists in the image block in which the first subunit or the second subunit is located, and when any one of the following conditions (1) to (3) is a true condition, setting the boundary strength value of the filtering boundary to 1; otherwise, setting the boundary strength value of the filtering boundary to 0:

(1) reference images of prediction units in which the first subunit and the second subunit are located are different or quantities of motion vectors of prediction units in which the first subunit and the second subunit are located are different; a prediction unit in which the first subunit is located has one motion vector; a prediction unit in which the second subunit is located has one motion vector; and a motion vector difference between horizontal components or vertical components of the motion vector of the first subunit and the motion vector of the second subunit is greater than or equal to a motion vector difference threshold T;

(2) a prediction unit in which the first subunit is located has two motion vectors and reference images indicated by the two motion vectors are different; a prediction unit in which the second subunit is located has two motion vectors and reference images indicated by the two motion vectors are different; and a motion vector difference between horizontal components or vertical components of two motion vectors indicating a same prediction image is greater than or equal to a motion vector difference threshold T; and (3) a prediction unit in which the first subunit is located has two motion vectors and reference images indicated by the two motion vectors are the same; a prediction unit in which the second subunit is located has two motion vectors and reference images indicated by the two motion vectors are the same; and the following two conditions a and b are true conditions:

(a) a difference between horizontal components or vertical components of two motion vectors that indicate a forward reference candidate list list0 is greater than or equal to a motion vector difference threshold T; or a difference between horizontal components or vertical components of two motion vectors that indicate a backward reference candidate list list1 is greater than or equal to a motion vector difference threshold T; and (b) a difference between horizontal components or vertical components of a motion vector that indicates a forward reference candidate list list0 and that is of the prediction unit in which the first subunit is located and a motion vector that indicates a backward reference candidate list list1 and that is of the prediction unit in which the second subunit is located is greater than or equal to a motion vector difference threshold T; or a difference between horizontal components or vertical components of a motion vector that indicates a backward reference candidate list list1 and that is of the prediction unit in which the first subunit is located and a motion vector that indicates a forward reference candidate list list0 and that is of the prediction unit in which the second subunit is located is greater than or equal to a motion vector difference threshold T.

The motion vector difference threshold T may be four times ¼ of luminance sampling precision; or if motion models of the prediction units in which the first subunit and the second subunit are located are different, the motion vector difference threshold T is ¼ of luminance sampling precision, or if motion models of the prediction units in which the first unit and the second subunit are located are the same, the motion vector difference threshold T is four times ¼ of luminance sampling precision.

The initial thresholds $\beta_0$ and $t_0$ are set as required, and this is not limited in this embodiment of the present invention.

For example, the thresholds $\beta$ and t are obtained based on the boundary strength value of the filtering boundary, the initial thresholds $\beta_0$ and $t_0$, the quantization parameter of the first subunit, and the quantization parameter of the second subunit.

The performing, based on $\beta$, t, and the pixel differences between the pixel values of the M pixels that are adjacent to the filtering boundary and that are in the first subunit and the second subunit, filtering processing on the pixels adjacent to the filtering boundary may include:

first substituting the initial thresholds $\beta_0$ and $t_0$, the quantization parameter of the first subunit, and the quantization parameter of the second subunit into a formula $qP_L=((Qp_Q+Qp_P)/2)$ to obtain $qP_L$, where $Qp_Q$ is the quantization parameter of the first subunit, and $Qp_P$ is the quantization parameter of the second subunit;

then obtaining two Q values based on formulas $Q=\text{Clip3}(0,51,qP_L+\beta_0*2)$ and $Q=\text{Clip3}(0, 53,qP_L+2*(BS-1)+t_0*2)$, and querying a preset table to obtain $\beta'$ corresponding to a Q value that is obtained based on the formula $Q=\text{Clip3}(0,51,qP_L+\beta_0*2)$ and obtain $t'_C$ corresponding to a Q value that is obtained based on the formula $Q=\text{Clip3}(0,53,qP_L+2*(BS-1)+t_0*2)$.

substituting $\beta'$ that is obtained by querying the table into a formula $\beta=\beta'*2^{BitDepth-8}$ to obtain the threshold $\beta$, where BitDepth indicates a bit width of a pixel;

substituting $t'_C$ that is obtained by querying the table into a formula $t=t'_C*2^{BitDepth-8}$ to obtain the threshold t; and comparing the pixel differences between the pixel values of the M pixels that are adjacent to the filtering boundary and that are in the first subunit and the second $$|p_{2,0} - 2p_{1,0} + p_{0,0}| + |p_{2,3} - 2p_{1,3} + p_{0,3}| +$$
$$|q_{2,0} - 2q_{1,0} + q_{0,0}| + |q_{2,3} - 2_{1,3} + q_{0,3}| > \beta$$

If pixels in a first row and a fourth row of P and pixels in a first row and a fourth row of Q meet the following formulas:

$$|p_{2,i} - 2p_{1,i} + p_{0,i}| + |q_{2,i} - 2q_{1,i} + q_{0,i}| < \beta/8,$$
$$|p_{3,i} - p_{0,i}| + |q_{0,i} - q_{3,i}| < \beta/8, \text{ and}$$
$$|p_{0,i} - q_{0,i}| < 2.5t,$$

strong filtering is performed on the pixels adjacent to the vertical filtering boundary, or if the foregoing condition is not met, weak filtering is performed, where a value of i is 0 or 3.

Optionally, the performing strong filtering on the pixels adjacent to the vertical filtering boundary may be: obtaining eight pixels adjacent to the vertical filtering boundary, and performing filtering by using a filter having five taps. For example, four pixels in the first row of P and four pixels in the first row of Q may be selected, and the eight pixels are filtered by using the filter having five taps.

The performing weak filtering on the pixels adjacent to the vertical filtering boundary may be: obtaining six pixels adjacent to the vertical filtering boundary, and performing filtering by using a filter having three taps. It should be noted that in this embodiment of the present invention, six pixels may be randomly selected from four pixels in the first row of P and four pixels in the first row of Q, and are filtered by using the filter having three taps.

The foregoing table may be set as required, and this is not limited in this embodiment of the present invention. For example, if the table is Table 1, the Q value that is obtained based on the formula $Q=\text{Clip3}(0,51,qP_L+\beta_0*2)$ is 11, and the Q value that is obtained based on the formula $Q\text{Clip3}(0,53, qP_L+2*(BS-1)+t_0*2)$ is 24, it can be learned from Table 1 that $\beta'$ is 0, and $t'_C$ is 1.

TABLE 1

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| $\beta'$ | 0 | 0 | 0 | 0 | 0 | 0 | 0 | 0 | 0 | 0 | 0 | 0 | 0 | 0 | 0 | 0 | 6 | 7 | 9 |
| $t'_C$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| $\beta'$ | 9 | 10 | 11 | 12 | 13 | 14 | 15 | 16 | 17 | 18 | 20 | 22 | 24 | 26 | 28 | 30 | 32 | 34 | 36 |
| $t'_C$ | 1 | 1 | 1 | 1 | 1 | 1 | 1 | 1 | 2 | 2 | 2 | 2 | 3 | 3 | 3 | 3 | 4 | 4 | 4 | subunit with $\beta$ and t, to determine whether filtering processing needs to be performed on the pixels adjacent to the filtering boundary.

For example, FIG. 5 is a structural diagram of a subunit adjacent to a vertical filtering boundary. As shown in FIG. 5, a first subunit P and a second subunit Q each include 4×4 pixels. If pixel values of the pixels in P and Q meet the following formula, it is determined to perform filtering processing on pixels adjacent to the vertical filtering boundary:

It can be learned from above that according to the filtering method for removing a blocking artifact provided in this embodiment of the present invention, each prediction unit is divided into the at least two subunits; each of the at least two subunits is traversed, and the at least one filtering boundary of the at least two subunits is determined based on the preset rule; the first pixel value of the first subunit and the first pixel value of the second subunit are obtained, where the first subunit and the second subunit are adjacent to the filtering boundary; and filtering processing is performed, based on the first pixel value of the first subunit and the first pixel value of the second subunit, on the pixels adjacent to the filtering boundary. In this way, not only pixels in units in the prediction unit that are located on two sides of the sub-block boundary of the prediction unit or the sub-block boundary of the transform unit are filtered, but also filtering processing can be performed on a boundary of the non-translational motion prediction unit in the prediction unit, so that a blocking artifact in the prediction unit is removed, and prediction precision and subjective quality of an image are improved, avoiding a problem that a blocking artifact cannot be removed because a filtering operation is performed only on an upper boundary and a left boundary of a prediction unit, and no filtering processing is performed on a boundary of an internal motion compensation block of the prediction unit.

Embodiment 2

Figure 6:
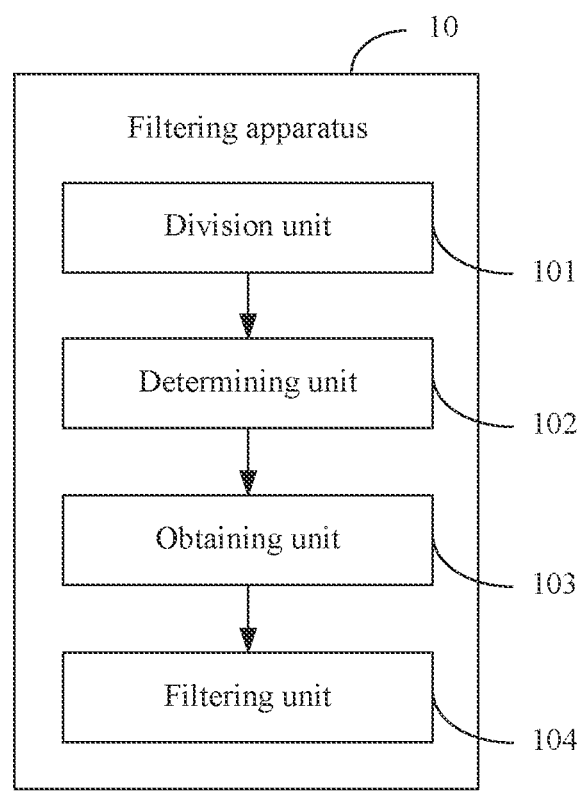
FIG. 6 is a structural diagram of a filtering apparatus according to an embodiment of the present invention.

FIG. 6 is a structural diagram of a filtering apparatus 10 according to an embodiment of the present invention. The filtering apparatus 10 is configured to perform filtering processing on an image block. The image block is divided into at least one prediction unit and at least one transform unit. The prediction unit includes a non-translational motion prediction unit. The filtering apparatus may be a video coding apparatus or a video decoding apparatus. The video coding apparatus or the video decoding apparatus may be any apparatus that needs to output or store a video, for example, a notebook computer, a tablet computer, a personal computer, a mobile phone, or a video server. As shown in FIG. 6, the filtering apparatus 10 may include:

a division unit 101, configured to divide each prediction unit into at least two subunits, where each subunit includes N×N pixels, and N is an integer greater than or equal to 1;

a determining unit 102, configured to: traverse each of the at least two subunits obtained by the division unit through division, and determine at least one filtering boundary of the at least two subunits based on a preset rule;

an obtaining unit 103, configured to obtain a first pixel value of a first subunit and a first pixel value of a second subunit, where the first subunit and the second subunit are adjacent to the filtering boundary; and a filtering unit 104, configured to perform, based on the first pixel value of the first subunit and the first pixel value of the second subunit that are obtained by the obtaining unit 103, filtering processing on pixels adjacent to the filtering boundary.

When the filtering boundary is horizontal, the first subunit is an upper subunit adjacent to the filtering boundary, and the second subunit is a lower subunit adjacent to the filtering boundary; or when the filtering boundary is vertical, the first subunit is a left subunit adjacent to the filtering boundary, and the second subunit is a right subunit adjacent to the filtering boundary.

It should be noted that the vertical filtering boundary is a sub-block boundary of a transform unit or a non-translational motion prediction unit in which sub-blocks of the transform unit or the non-translational motion prediction unit are horizontally placed, and the horizontal filtering boundary is a sub-block boundary of a transform unit or a non-translational motion prediction unit in which sub-blocks of the transform unit or the non-translational motion prediction unit are vertically placed. It may be understood that in the present invention, the image block is a plane including an x-axis (namely, a horizontal direction) and a y-axis (a vertical direction). Therefore, "horizontal" means being parallel with the x-axis and "vertical" means being parallel with the y-axis. For example, as shown in FIG. 3, a sub-block boundary of a transform unit is a vertical filtering boundary, in which sub-blocks of the transform unit are placed parallel with the x-axis.

Further, for any one of the at least two subunits, the determining unit 102 is specifically configured to:

if the subunit is included in the non-translational motion prediction unit, determine each boundary of the subunit as a filtering boundary; or if a first boundary of the subunit is a sub-block boundary of the prediction unit in the image block or a first boundary of the subunit is a sub-block boundary of the transform unit in the image block, determine the first boundary of the subunit as a filtering boundary, where the first boundary is any boundary of the subunit.

In this way, not only a boundary that is in the prediction unit and that is located on the sub-block boundary of the prediction unit or the sub-block boundary of the transform unit is determined as a filtering boundary, and subsequent filtering processing is performed on the boundary, but also a boundary of the non-translational motion prediction unit can be determined as a filtering boundary, and filtering processing is performed on the boundary of the non-translational motion prediction unit in the prediction unit, so that a blocking artifact between non-translational motion prediction units in the prediction unit is removed.

Further, the obtaining unit 103 may be configured to obtain the first pixel value of the first subunit in the following manner 1 or manner 2.

Manner 1: Obtain a first predicted pixel value of the first subunit;

calculate motion vectors of M subunits in an upper subunit, a lower subunit, a left subunit, and a right subunit that are adjacent to the first subunit, where M is any integer ranging from 1 to 4; and obtain the first pixel value of the first subunit based on the first predicted pixel value of the first subunit and the M second predicted pixel values by using a first preset algorithm.

It should be noted that in this embodiment of the present invention, the motion vector includes a horizontal component and a vertical component. The horizontal component is a component parallel with the x-axis, and the vertical component is a component parallel with the y-axis.

The first predicted pixel value of the first subunit may be an original pixel value that is derived based on a motion model. For example, when the first subunit is an affine motion unit, a motion vector of each pixel in the first subunit may be obtained based on the foregoing affine motion model (1). Then each pixel in the first subunit is traversed to find, in a designated reference frame based on the motion vector of the pixel, a pixel that matches the pixel. A pixel value of the pixel in the reference frame is used as a predicted pixel value of the pixel in the first subunit. Predicted pixel values that are obtained by traversing all the pixels are combined into first predicted pixel values of the first subunit. It may be understood that if the first subunit includes N×N pixels, the obtained first predicted pixel values of the first subunit are an N×N matrix. In addition, an existing interpolation filtering algorithm may be used to find, in the designated reference frame based on the motion vector of the pixel, the pixel that matches the pixel, and this is not described in detail herein.

The upper subunit adjacent to the first subunit is a subunit adjacent to an upper boundary of the first subunit, the lower subunit adjacent to the first subunit is a subunit adjacent to a lower boundary of the first subunit, the left subunit adjacent to the first subunit is a subunit adjacent to a left boundary of the first subunit, and the right subunit adjacent to the first subunit is a subunit adjacent to a right boundary of the first subunit.

For example, as shown in FIG. 3, if the first subunit is a subunit 2, a subunit a is the upper subunit of the first subunit, a subunit b is the lower subunit of the first subunit, a subunit c is the left subunit of the first subunit, and a subunit d is the right subunit of the first subunit.

Optionally, the calculating motion vectors of M subunits in an upper subunit, a lower subunit, a left subunit, and a right subunit that are adjacent to the first subunit may include:

if the first subunit is included in the non-translational motion prediction unit, or the first subunit is a subunit adjacent to a lower boundary or a right boundary of the non-translational motion prediction unit, deriving, based on a preset non-translational motion model, the motion vectors of the M subunits in the upper subunit, the lower subunit, the left subunit, and the right subunit that are adjacent to the first subunit; or if the first subunit is a subunit adjacent to an upper boundary of the non-translational motion prediction unit, deriving, based on a preset non-translational motion model, motion vectors of three subunits: the lower subunit, the left subunit, and the right subunit that are adjacent to the first subunit; and if a motion vector of a prediction unit in which the upper subunit adjacent to the first subunit is located exists, using a motion vector of the first subunit as a motion vector of the upper subunit; or if an intra-frame coding mode is used for the first subunit or a motion vector of the first subunit does not exist, deriving a motion vector of the upper subunit by using the preset non-translational motion model; or if the first subunit is a subunit adjacent to a left boundary of the non-translational motion prediction unit, deriving, based on a preset non-translational motion model, motion vectors of three subunits: the lower subunit, the upper subunit, and the right subunit that are adjacent to the first subunit; and if a motion vector of a prediction unit in which the left subunit adjacent to the first subunit is located exists, using a motion vector of the first subunit as a motion vector of the left subunit; or if an intra-frame coding mode is used for the first subunit or a motion vector of the first subunit does not exist, deriving a motion vector of the left subunit by using the preset non-translational motion model.

In this embodiment of the present invention, the non-translational motion may be any irregular motion such as an affine motion, a scale motion, a rotational motion, or a perspective motion. Therefore, corresponding to different non-translational motions, the deriving a motion vector of the subunit by using the preset non-translational motion model may include:

deriving the motion vector of the subunit based on the affine motion model (1); or deriving the motion vector of the subunit based on a scale motion model (2); or deriving the motion vector of the subunit based on a rotational motion model (3); or deriving the motion vector of the subunit based on a perspective motion model (4).

The second predicted pixel value may be a new pixel value that is obtained by performing motion compensation on the first subunit by using a subunit adjacent to the first subunit. Specifically, when M is 4, the obtaining unit 103 may be configured to:

perform motion compensation on the first subunit based on the motion vector of the upper subunit adjacent to the first subunit, to obtain one second predicted pixel value;

perform motion compensation on the first subunit based on a motion vector of the lower subunit adjacent to the first subunit, to obtain one second predicted pixel value;

perform motion compensation on the first subunit based on the motion vector of the left subunit adjacent to the first subunit, to obtain one second predicted pixel value;

perform motion compensation on the first subunit based on a motion vector of the right subunit adjacent to the first subunit, to obtain one second predicted pixel value; and separately weight the first predicted pixel value of the first subunit and the four second predicted pixel values, and average results after the weighting to obtain the first pixel value of the first subunit.

It should be noted that an implementation of performing motion compensation on the first subunit based on the motion vector of the upper subunit adjacent to the first subunit, to obtain one second predicted pixel value is basically the same as that of performing motion compensation based on the lower subunit or the left subunit or the right subunit adjacent to the first subunit. For ease of description, herein only the implementation of performing motion compensation on the first subunit based on the motion vector of the upper subunit adjacent to the first subunit, to obtain one second predicted pixel value is used as an example for description.

For example, the obtaining unit 103 may use the motion vector of the upper subunit adjacent to the first subunit as the motion vector of the first subunit, then find, in the designated reference frame based on the motion vector, a unit that matches the first subunit, and use a pixel value of the matched unit in the reference frame as a second predicted pixel value of the first subunit.

Optionally, the separately weighting the first predicted pixel value of the first subunit and the M second predicted pixel values, and averaging results after the weighting to obtain the first pixel value of the first subunit may include:

first weighting the first predicted pixel value and each second predicted pixel value of the first subunit based on a formula (5), to obtain M weighted pixel values, and averaging the M weighted pixel values to obtain the first pixel value of the first subunit.

Manner 2: Obtain a first predicted pixel value of the first subunit P;

derive, based on a preset non-translational motion model, motion vectors of M sets of coordinates in upper coordinates 1.1, lower coordinates 1.2, left coordinates 1.3, and right coordinates 1.4 that are adjacent to a first vertex 1 of the first subunit P, and motion vectors of M sets of coordinates in upper coordinates 2.1, lower coordinates 2.2, left coordinates 2.3, and right coordinates 2.4 that are adjacent to a second vertex 2 of the first subunit P, where M is any integer ranging from 1 to 4;

obtain M motion vector pairs by grouping the motion vectors of the M sets of coordinates in the upper coordinates 1.1, the lower coordinates 1.2, the left coordinates 1.3, and the right coordinates 1.4 that are adjacent to the first vertex 1 of the first subunit P, and the motion vectors of the M sets of coordinates in the upper coordinates 2.1, the lower coordinates 2.2, the left coordinates 2.3, and the right coordinates 2.4 that are adjacent to the second vertex 2 of the first subunit P, where a first motion vector pair in the M motion vector pairs includes a motion vector of first coordinates adjacent to the first vertex 1 of the first subunit P and a motion vector of first coordinates adjacent to the second vertex 2 of the first subunit P, and the first coordinates are upper coordinates or lower coordinates or left coordinates or right coordinates;

separately perform calculation on the M motion vector pairs based on the preset non-translational motion model, to obtain M motion vectors of the first subunit P;

obtain M second predicted pixel values of the first subunit P based on the M motion vectors of the first subunit P; and obtain the first pixel value of the first subunit P based on the first predicted pixel value of the first subunit P and the M second predicted pixel values by using a first preset algorithm.

For example, when M=4, motion vectors of the four sets of coordinates: the upper coordinates, the lower coordinates, the left coordinates, and the right coordinates that are adjacent to the first vertex of the first subunit, and motion vectors of the four sets of coordinates: the upper coordinates, the lower coordinates, the left coordinates, and the right coordinates that are adjacent to the second vertex of the first subunit may be derived based on the preset non-translational motion model.

The first motion vector pair includes a motion vector of the upper coordinates adjacent to the first vertex of the first subunit and a motion vector of the upper coordinates adjacent to the second vertex of the first subunit. A second motion vector pair includes a motion vector of the lower coordinates adjacent to the first vertex of the first subunit and a motion vector of the lower coordinates adjacent to the second vertex of the first subunit. A third motion vector pair includes a motion vector of the left coordinates adjacent to the first vertex of the first subunit and a motion vector of the left coordinates adjacent to the second vertex of the first subunit. A fourth motion vector pair includes a motion vector of the right coordinates adjacent to the first vertex of the first subunit and a motion vector of the right coordinates adjacent to the second vertex of the first subunit.

Calculation is separately performed on the first motion vector pair, the second motion vector pair, the third motion vector pair, and the fourth motion vector pair based on the preset non-translational motion model, to obtain four motion vectors of the first subunit. Four second predicted pixel values of the first subunit are obtained based on the four motion vectors of the first subunit. The first predicted pixel value of the first subunit and the four second predicted pixel values are separately weighted. Results after the weighting are averaged to obtain the first pixel value of the first subunit.

A method for obtaining the first predicted pixel value of the first subunit in the manner 2 is the same as a method for obtaining the first predicted pixel value of the first subunit in the manner 1, and details are not described herein again.

In addition, in the manner 2, a manner in which the M second predicted pixel values of the first subunit are obtained based on the M motion vectors of the first subunit, the first predicted pixel value of the first subunit and the M second predicted pixel values are separately weighted, and the results after the weighting are averaged to obtain the first pixel value of the first subunit is also the same as that in the manner 1, and details are not described herein again.

The upper coordinates 1.1 adjacent to the first vertex 1 of the first subunit P may be coordinates of a first vertex of a subunit adjacent to an upper boundary of the first subunit. The lower coordinates 1.2 adjacent to the first vertex 1 of the first subunit P may be coordinates of a first vertex of a subunit adjacent to a lower boundary of the first subunit P. The left coordinates 1.3 adjacent to the first vertex of the first subunit P may be coordinates of a first vertex of a subunit adjacent to a left boundary of the first subunit. The right coordinates 1.4 adjacent to the first vertex of the first subunit P may be coordinates of a first vertex of a subunit adjacent to a right boundary of the first subunit.

The upper coordinates 2.1 adjacent to the second vertex 2 of the first subunit P may be coordinates of a second vertex of the subunit adjacent to the upper boundary of the first subunit. The lower coordinates 2.2 adjacent to the second vertex 2 of the first subunit P may be coordinates of a second vertex of the subunit adjacent to the lower boundary of the first subunit. The left coordinates 2.3 adjacent to the second vertex 2 of the first subunit P may be coordinates of a second vertex of the subunit adjacent to the left boundary of the first subunit. The right coordinates 2.4 adjacent to the second vertex 2 of the first subunit P may be coordinates of a second vertex of the subunit adjacent to the right boundary of the first subunit. It should be noted that in this embodiment of the present invention, a first vertex of a subunit may be any one of four vertexes: an upper left vertex, a lower left vertex, an upper right vertex, and a lower right vertex of the subunit, and a second vertex of the subunit may be any one of vertexes other than the first vertex in the four vertexes: the upper left vertex, the lower left vertex, the upper right vertex, and the lower right vertex of the subunit. A vertex of the subunit may be a coordinate point of a pixel at a position of the vertex. Generally, an upper left vertex of the first subunit P is set as an origin (0, 0), and coordinates of other vertexes are correspondingly set based on a position of the origin.

It may be understood that the motion vectors of the upper, lower, left, and right coordinates that are adjacent to the first vertex or the second vertex of the first subunit may be derived based on the preset non-translational motion model (1) or (2) or (3) or (4).

The determining unit 102 is further configured to: before the filtering unit 104 performs, based on the first pixel value of the first subunit and the first pixel value of the second subunit that are obtained by the obtaining unit 103, filtering processing on the pixels adjacent to the filtering boundary, determine a boundary strength value of the filtering boundary.

The filtering unit 104 may be specifically configured to: obtain thresholds $\beta$ and t based on the boundary strength value of the filtering boundary, initial thresholds $\beta_0$ and $t_0$, a quantization parameter of the first subunit, and a quantization parameter of the second subunit; and perform, based on $\beta$, t, and pixel differences between pixel values of M pixels that are adjacent to the filtering boundary and that are in the first subunit and the second subunit, filtering processing on the pixels adjacent to the filtering boundary, where M is an integer greater than or equal to 1.

The determining unit 102 is specifically configured to:
if at least one intra-frame prediction unit exists in the image block in which the first subunit or the second subunit is located, set the boundary strength value of the filtering boundary to 2; or if no intra-frame prediction unit exists in the image block in which the first subunit or the second subunit is located, the filtering boundary is the sub-block boundary of the transform unit, and the transform unit in which the first subunit or the second subunit is located has at least one non-zero coefficient, set the boundary strength value of the filtering boundary to 1; or if no intra-frame prediction unit exists in the image block in which the first subunit or the second subunit is located, and when any one of the following conditions (1) to (3) is a true condition, set the boundary strength value of the filtering boundary to 1; otherwise, set the boundary strength value of the filtering boundary to 0:

(1) reference images of prediction units in which the first subunit and the second subunit are located are different or quantities of motion vectors of prediction units in which the first subunit and the second subunit are located are different; a prediction unit in which the first subunit is located has one motion vector; a prediction unit in which the second subunit is located has one motion vector; and a motion vector difference between horizontal components or vertical components of the motion vector of the first subunit and the motion vector of the second subunit is greater than or equal to a motion vector difference threshold T;

(2) a prediction unit in which the first subunit is located has two motion vectors and reference images indicated by the two motion vectors are different; a prediction unit in which the second subunit is located has two motion vectors and reference images indicated by the two motion vectors are different; and a motion vector difference between horizontal components or vertical components of two motion vectors indicating a same prediction image is greater than or equal to a motion vector difference threshold T; and (3) a prediction unit in which the first subunit is located has two motion vectors and reference images indicated by the two motion vectors are the same; a prediction unit in which the second subunit is located has two motion vectors and reference images indicated by the two motion vectors are the same; and the following two conditions a and b are true conditions:

(a) a difference between horizontal components or vertical components of two motion vectors that indicate a forward reference candidate list list0 is greater than or equal to a motion vector difference threshold T; or a difference between horizontal components or vertical components of two motion vectors that indicate a backward reference candidate list list1 is greater than or equal to a motion vector difference threshold T; and (b) a difference between horizontal components or vertical components of a motion vector that indicates a forward reference candidate list list0 and that is of the prediction unit in which the first subunit is located and a motion vector that indicates a backward reference candidate list list1 and that is of the prediction unit in which the second subunit is located is greater than or equal to a motion vector difference threshold T; or a difference between horizontal components or vertical components of a motion vector that indicates a backward reference candidate list list1 and that is of the prediction unit in which the first subunit is located and a motion vector that indicates a forward reference candidate list list0 and that is of the prediction unit in which the second subunit is located is greater than or equal to a motion vector difference threshold T.

The motion vector difference threshold T may be four times ¼ of luminance sampling precision; or if motion models of the prediction units in which the first subunit and the second subunit are located are different, the motion vector difference threshold T is ¼ of luminance sampling precision, or if motion models of the prediction units in which the first unit and the second subunit are located are the same, the motion vector difference threshold T is four times ¼ of luminance sampling precision.

The initial thresholds $\beta_0$ and $t_0$ are set as required, and this is not limited in this embodiment of the present invention.

Further, that the filtering unit 104 is specifically configured to perform, based on $\beta$, t, and pixel differences between pixel values of M pixels that are adjacent to the filtering boundary and that are in the first subunit and the second subunit, filtering processing on the pixels adjacent to the filtering boundary may include:

first substituting the initial thresholds $\beta_0$ and $t_0$, the quantization parameter of the first subunit, and the quantization parameter of the second subunit into a formula $qP_L=((Qp_Q+Qp_P)/2)$ to obtain $qP_L$, where $Qp_Q$ is the quantization parameter of the first subunit, and $Qp_P$ is the quantization parameter of the second subunit;

then obtaining two Q values based on formulas $Q=\text{Clip3}(0,51,qP_L+\beta_0*2)$ and $Q=\text{Clip3}(0,53,qP_L+2*(BS-1)+t_0*2)$, and querying a preset table, to obtain corresponding to a Q value that is obtained based on the formula $Q=\text{Clip3}(0,51,qP_L+\beta_0*2)$ and obtain $t'_C$ corresponding to a Q value that is obtained based on the formula $Q=\text{Clip3}(0,53,qP_L+2*(BS-1)+t_0*2)$;

substituting $\beta'$ that is obtained by querying the table into a formula $\mu=\mu'*2^{BitDepth-8}$ to obtain the threshold $\beta$, where BitDepth indicates a bit width of a pixel;

substituting $t'_C$ that is obtained by querying the table into a formula $t=t'_C*2^{BitDepth-8}$ to obtain the threshold t; and comparing the pixel differences between the pixel values of the M pixels that are adjacent to the filtering boundary and that are in the first subunit and the second subunit with $\beta$ and t, to determine whether filtering processing needs to be performed on the pixels adjacent to the filtering boundary.

It should be noted that the division unit, the obtaining unit, the determining unit, and the filtering unit in the filtering apparatus shown in FIG. 6 may be the processor that is independently disposed in the filtering apparatus shown in FIG. 1, or may be integrated into a processor in the filtering apparatus for implementation. In addition, execution processes of the division unit, the obtaining unit, the determining unit, and the filtering unit may be stored in a form of program code in the memory in the filtering apparatus shown in FIG. 1, and a processor of the filtering apparatus invokes the program code and implements the execution processes of the division unit, the obtaining unit, the determining unit, and the filtering unit. The processor described herein may be a central processing unit (Central Processing Unit, CPU), or an application-specific integrated circuit (Application Specific Integrated Circuit, ASIC), or one or more integrated circuits configured to implement this embodiment of the present invention.

It can be learned from above that the filtering apparatus provided in this embodiment of the present invention divides each prediction unit into the at least two subunits; traverses each of the at least two subunits obtained by the division unit through division, and determines the at least one filtering boundary of the at least two subunits based on the preset rule; obtains the first pixel value of the first subunit and the first pixel value of the second subunit, where the first subunit and the second subunit are adjacent to the filtering boundary; and performs, based on the first pixel value of the first subunit and the first pixel value of the second subunit, filtering processing on the pixels adjacent to the filtering boundary. In this way, not only pixels in units in the prediction unit that are located on two sides of the sub-block boundary of the prediction unit or the sub-block boundary of the transform unit are filtered, but also filtering processing can be performed on a boundary of the non-translational motion prediction unit in the prediction unit, so that a blocking artifact in the prediction unit is removed, and prediction precision and subjective quality of an image are improved, avoiding a problem that a blocking artifact cannot be removed because a filtering operation is performed only on an upper boundary and a left boundary of a prediction unit, and no filtering processing is performed on a boundary of an internal motion compensation block of the prediction unit.

It may be clearly understood by persons skilled in the art that for the purpose of convenient and brief description, refer to a corresponding process in the foregoing method embodiments for a specific working process of the foregoing units and system, and details are not described herein again.

In the several embodiments provided in this application, it should be understood that the disclosed system, device, and method may be implemented in other manners. For example, the device embodiment described above is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located at one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

It may be understood by persons of ordinary skill in the art that all or some of the steps of the methods in the embodiments may be implemented by a program instructing relevant hardware (such as a processor). The program may be stored in a computer-readable storage medium. The storage medium may include: a read-only memory, a random access memory, a magnetic disk, an optical disc, or the like.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A non-transitory computer readable medium comprising a bitstream generated by a method for processing an image block, wherein the image block is an affine motion image block that is one of a plurality of image blocks of an image and the affine motion image block comprises two or more affine motion subunits, wherein each affine motion subunit comprises a plurality of pixels, the method comprising:

for an affine motion subunit comprised in the affine motion image block, determining a boundary of the affine motion subunit as a filtering boundary:

for the filtering boundary, obtaining pixel values of a first affine motion subunit and pixel values of a second affine motion subunit, wherein the first affine motion subunit and the second affine motion subunit are adjacent to the filtering boundary and in the two or more affine motion subunits;

determining a boundary strength value of the filtering boundary;

performing, based on the boundary strength value of the filtering boundary, the pixel values of the first affine motion subunit, and the pixel values of the second affine motion subunit, filtering processing on pixels adjacent to the filtering boundary; and encoding prediction mode information into the bitstream, wherein the prediction mode information indicates an affine motion mode of the affine motion image block, wherein the determining the boundary strength value of the filtering boundary comprises:

setting the boundary strength value of the filtering boundary to 1 when:

the first affine motion subunit has two motion vectors and reference images indicated by the two motion vectors are the same;

the second affine motion subunit has two motion vectors and reference images indicated by the two motion vectors are the same;

a difference between horizontal components or vertical components of two motion vectors that indicate a forward reference candidate list (list0) is greater than or equal to a motion vector difference threshold (T), or a difference between horizontal components or vertical components of two motion vectors that indicate a backward reference candidate list (list01) is greater than or equal to the motion vector difference threshold (T); and a difference between horizontal components or vertical components of a motion vector that indicates a forward reference candidate list (list0) and that is of the first affine motion subunit and a motion vector that indicates a backward reference candidate list (list01) and that is of the second affine motion subunit is greater than or equal to the motion vector difference threshold (T), or a difference between horizontal components or vertical components of a motion vector that indicates a backward reference candidate list (list01) and that is of the first affine motion subunit and a motion vector that indicates a forward reference candidate list (list0) and that is of the second affine motion subunit is greater than or equal to the motion vector difference threshold (T).

2. The non-transitory computer readable medium according to claim 1, wherein the affine motion subunit is one of the first affine motion subunit and the second affine motion subunit.

3. The non-transitory computer readable medium according to claim 1, wherein the obtaining the pixel values of the first affine motion subunit comprises:
  obtaining first predicted pixel values of the first affine motion subunit based on a motion vector of the first affine motion subunit;
  obtaining motion vectors of M subunits in an upper subunit, a lower subunit, a left subunit, and a right subunit that are adjacent to the first affine motion subunit, wherein M is any integer and 1=<M<=4;
  obtaining M second predicted pixel values of the first affine motion subunit based on the motion vectors of the M subunits; and
  obtaining the pixel values of the first affine motion subunit based on the first predicted pixel values of the first affine motion subunit and the M second predicted pixel values.

4. The non-transitory computer readable medium according to claim 3, wherein M-4, the obtaining motion vectors of the M subunits in the upper subunit, the lower subunit, the left subunit, and the right subunit that are adjacent to the first affine motion subunit comprises:
  if the first affine motion subunit is a subunit adjacent to a lower boundary or a right boundary of the affine motion image block, deriving, based on a affine motion model, the motion vector of each of the upper subunit, the lower subunit, the left subunit, and the right subunit that are adjacent to the first affine motion subunit.

5. The non-transitory computer readable medium according to claim 3, wherein M=4, the obtaining motion vectors of the M subunits in the upper subunit, the lower subunit, the left subunit, and the right subunit that are adjacent to the first affine motion subunit comprises:
  if the first affine motion subunit is a subunit adjacent to an upper boundary of the affine motion image block, deriving, based on a preset affine motion model, motion vectors of the lower subunit, the left subunit, and the right subunit that are adjacent to the first affine motion subunit; and
  if a motion vector of the upper subunit adjacent to the first affine motion subunit is available, obtaining the motion vector of the upper subunit; or
  if a motion vector of the upper subunit adjacent to the first affine motion subunit is unavailable, deriving the motion vector of the upper subunit based on the affine motion model.

6. The non-transitory computer readable medium according to claim 3, wherein M=4, the obtaining motion vectors of the M subunits in the upper subunit, the lower subunit, the left subunit, and the right subunit that are adjacent to the first affine motion subunit comprises:
  if the first affine motion subunit is a subunit adjacent to a left boundary of the affine motion image block, deriving, based on a preset affine motion model, motion vectors the lower subunit, the upper subunit, and the right subunit that are adjacent to the first affine motion subunit; and
  if a motion vector of the left subunit adjacent to the first affine motion subunit is available, obtaining the motion vector of the left subunit; or
  if a motion vector of the left subunit adjacent to the first affine motion subunit is unavailable, deriving the motion vector of the left subunit based on the affine motion model.

7. The non-transitory computer readable medium according to claim 1, wherein the obtaining pixel values of the first affine motion subunit adjacent to the filtering boundary comprises:
  obtaining first predicted pixel values of the first affine motion subunit (P);
  deriving, based on a affine motion model, motion vectors of M sets of coordinates in up, down, left and right coordinates in subunits that are adjacent on the up, down, left and right to the first affine motion subunit (P) having a first vertex, which correspond to the first vertex (1) of the first affine motion subunit (P), and motion vectors of M sets of coordinates in up, down, left and right coordinates in the subunits that are adjacent on the up, down, left and right to the first affine motion subunit (P) having a second vertex, which correspond to the second vertex of the first affine motion subunit (P), wherein the first vertex and the second vertex are any two different vertexes of the first affine motion subunit (P), and M is any integer and 1=<M<=4;
  obtaining M motion vector pairs by grouping the motion vectors of the M sets of coordinates in the up, down, left and right coordinates in the subunits that are adjacent on the up, down, left and right to the first affine motion subunit (P) having the first vertex, which correspond to the first vertex of the first affine motion subunit (P), and the motion vectors of the M sets of coordinates in the up, down, left and right coordinates in the subunits that are adjacent on the up, down, left and right to the first affine motion subunit (P) having the second vertex, which correspond to the second vertex of the first affine motion subunit (P), wherein a first motion vector pair in the M motion vector pairs comprises a motion vector of first coordinates corresponding to the first vertex of the first affine motion subunit (P) and a motion vector of first coordinates corresponding to the second vertex of the first affine motion subunit (P), and the first coordinates are upper coordinates or lower coordinates or left coordinates or right coordinates;
  performing calculation on the M motion vector pairs based on the affine motion model, to obtain M motion vectors of the first affine motion subunit (P);
  obtaining M second predicted pixel values of the first affine motion subunit (P) based on the M motion vectors of the first affine motion subunit (P); and
  obtaining the pixel values of the first affine motion subunit (P) based on the first predicted pixel values of the first affine motion subunit (P) and the M second predicted pixel values.

8. The non-transitory computer readable medium according to claim 1, wherein:
  the motion vector difference threshold (T) is four times ¼ of luminance sampling precision; or if motion models of the first affine motion subunit and the second affine motion subunit are different, the motion vector difference threshold (T) is ¼ of luminance sampling precision, or if motion models of the first affine motion subunit and the second affine motion subunit are the same, the motion vector difference threshold (T) is four times ¼ of luminance sampling precision.

9. A method for processing an image block, wherein the image block is an affine motion image block that is one of a plurality of image blocks of an image and the affine motion image block comprises two or more affine motion subunits, wherein each affine motion subunit comprises a plurality of pixels, the method comprising:
 for an affine motion subunit comprised in the affine motion image block, determining a boundary of the affine motion subunit as a filtering boundary;
 for the filtering boundary, obtaining pixel values of a first affine motion subunit and pixel values of a second affine motion subunit, wherein the first affine motion subunit and the second affine motion subunit are adjacent to the filtering boundary and in the two or more affine motion subunits;
 determining a boundary strength value of the filtering boundary;
 performing, based on the boundary strength value of the filtering boundary, the pixel values of the first affine motion subunit and the pixel values of the second affine motion subunit, filtering processing on pixels adjacent to the filtering boundary; and
 encoding prediction mode information into a bitstream, wherein the prediction mode information indicates an affine motion mode of the affine motion image block,
 wherein the determining the boundary strength value of the filtering boundary comprises:
 setting the boundary strength value of the filtering boundary to 1 when:
  the first affine motion subunit has two motion vectors and reference images indicated by the two motion vectors are the same;
  the second affine motion subunit has two motion vectors and reference images indicated by the two motion vectors are the same;
  a difference between horizontal components or vertical components of two motion vectors that indicate a forward reference candidate list (list0) is greater than or equal to a motion vector difference threshold (T), or a difference between horizontal components or vertical components of two motion vectors that indicate a backward reference candidate list (list01) is greater than or equal to the motion vector difference threshold (T); and
  a difference between horizontal components or vertical components of a motion vector that indicates a forward reference candidate list (list0) and that is of the first affine motion subunit and a motion vector that indicates a backward reference candidate list (list01) and that is of the second affine motion subunit is greater than or equal to the motion vector difference threshold (T), or a difference between horizontal components or vertical components of a motion vector that indicates a backward reference candidate list (list01) and that is of the first affine motion subunit and a motion vector that indicates a forward reference candidate list (list0) and that is of the second affine motion subunit is greater than or equal to the motion vector difference threshold (T).

10. The method according to claim 9, wherein the affine motion subunit is one of the first affine motion subunit and the second affine motion subunit.

11. The method according to claim 9, wherein:
 the motion vector difference threshold (T) is four times ¼ of luminance sampling precision; or
 if motion models of the first affine motion subunit and the second affine motion subunit are different, the motion vector difference threshold (T) is ¼ of luminance sampling precision, or if motion models of the first affine motion subunit and the second affine motion subunit are the same, the motion vector difference threshold (T) is four times ¼ of luminance sampling precision.

12. An apparatus for processing an image block, wherein the image block is an affine motion image block that is one of a plurality of image blocks of an image and the affine motion image block comprises two or more affine motion subunits, wherein each affine motion subunit comprises a plurality of pixels, the apparatus comprising:
 a processor configured to:
 determine a boundary of the affine motion subunit as a filtering boundary, for an affine motion subunit comprised in the affine motion image block;
 obtain, for the filtering boundary, pixel values of a first affine motion subunit and pixel values of a second affine motion subunit, wherein the first affine motion subunit and the second affine motion subunit are adjacent to the filtering boundary and in the two or more affine motion subunits;
 determine a boundary strength value of the filtering boundary;
 perform, based on the boundary strength value of the filtering boundary, the pixel values of the first affine motion subunit and the pixel values of the second affine motion subunit, filtering processing on pixels adjacent to the filtering boundary; and
 encode prediction mode information into a bitstream, wherein the prediction mode information indicates an affine motion mode of the affine motion image block,
 wherein the determining the boundary strength value of the filtering boundary comprises:
 setting the boundary strength value of the filtering boundary to 1 when:
  the first affine motion subunit has two motion vectors and reference images indicated by the two motion vectors are the same;
  the second affine motion subunit has two motion vectors and reference images indicated by the two motion vectors are the same; and the following two conditions a and b are true conditions:
  a difference between horizontal components or vertical components of two motion vectors that indicate a forward reference candidate list (list0) is greater than or equal to a motion vector difference threshold (T), or a difference between horizontal components or vertical components of two motion vectors that indicate a backward reference candidate list (list01) is greater than or equal to the motion vector difference threshold (T); and
  a difference between horizontal components or vertical components of a motion vector that indicates a forward reference candidate list (list0) and that is of the first affine motion subunit and a motion vector that indicates a backward reference candidate list (list01) and that is of the second affine motion subunit is greater than or equal to the motion vector difference threshold (T), or a difference between horizontal components or vertical components of a motion vector that indicates a backward reference candidate list (list01) and that is of the first affine motion subunit and a motion vector that indicates a forward reference candidate list (list0) and that is of the second affine motion subunit is greater than or equal to the motion vector difference threshold (T).

13. The apparatus according to claim 12, wherein the affine motion subunit is one of the first affine motion subunit and the second affine motion subunit.

14. The apparatus according to claim 12, wherein:
the motion vector difference threshold (T) is four times ¼ of luminance sampling precision; or
if motion models of the first affine motion subunit and the second affine motion subunit are different, the motion vector difference threshold (T) is ¼ of luminance sampling precision, or if motion models of the first affine motion subunit and the second affine motion subunit are the same, the motion vector difference threshold (T) is four times ¼ of luminance sampling precision.

15. The method according to claim 9, wherein obtaining the pixel values of the first affine motion subunit comprises:
obtaining first predicted pixel values of the first affine motion subunit based on a motion vector of the first affine motion subunit;
obtaining motion vectors of M subunits in an upper subunit, a lower subunit, a left subunit, and a right subunit that are adjacent to the first affine motion subunit, wherein M is any integer and 1=<M<=4;
obtaining M second predicted pixel values of the first affine motion subunit based on the motion vectors of the M subunits; and
obtaining the pixel values of the first affine motion subunit based on the first predicted pixel values of the first affine motion subunit and the M second predicted pixel values.

16. The method according to claim 15, wherein M-4, wherein obtaining the motion vectors of the M subunits in the upper subunit, the lower subunit, the left subunit, and the right subunit that are adjacent to the first affine motion subunit comprises:
if the first affine motion subunit is a subunit adjacent to a lower boundary or a right boundary of the affine motion image block, deriving, based on a affine motion model, the motion vector of each of the upper subunit, the lower subunit, the left subunit, and the right subunit that are adjacent to the first affine motion subunit.

17. The method according to claim 15, wherein M=4, wherein obtaining the motion vectors of the M subunits in the upper subunit, the lower subunit, the left subunit, and the right subunit that are adjacent to the first affine motion subunit comprises:
if the first affine motion subunit is a subunit adjacent to an upper boundary of the affine motion image block, deriving, based on a preset affine motion model, motion vectors of the lower subunit, the left subunit, and the right subunit that are adjacent to the first affine motion subunit; and
if a motion vector of the upper subunit adjacent to the first affine motion subunit is available, obtaining the motion vector of the upper subunit; or
if a motion vector of the upper subunit adjacent to the first affine motion subunit is unavailable, deriving the motion vector of the upper subunit based on the affine motion model.

18. The method according to claim 15, wherein M=4, wherein obtaining the motion vectors of the M subunits in the upper subunit, the lower subunit, the left subunit, and the right subunit that are adjacent to the first affine motion subunit comprises:
if the first affine motion subunit is a subunit adjacent to a left boundary of the affine motion image block, deriving, based on a preset affine motion model, motion vectors the lower subunit, the upper subunit, and the right subunit that are adjacent to the first affine motion subunit; and
if a motion vector of the left subunit adjacent to the first affine motion subunit is available, obtaining the motion vector of the left subunit; or
if a motion vector of the left subunit adjacent to the first affine motion subunit is unavailable, deriving the motion vector of the left subunit based on the affine motion model.

19. The method according to claim 9, wherein the obtaining pixel values of the first affine motion subunit adjacent to the filtering boundary comprises:
obtaining first predicted pixel values of the first affine motion subunit (P);
deriving, based on a affine motion model, motion vectors of M sets of coordinates in up, down, left and right coordinates in subunits that are adjacent on the up, down, left and right to the first affine motion subunit (P) having a first vertex, which correspond to the first vertex of the first affine motion subunit (P), and motion vectors of M sets of coordinates in up, down, left and right coordinates in the subunits that are adjacent on the up, down, left and right to the first affine motion subunit (P) having a second vertex, which correspond to the second vertex of the first affine motion subunit (P), wherein the first vertex and the second vertex are any two different vertexes of the first affine motion subunit (P), and M is any integer and 1=<M<=4;
obtaining M motion vector pairs by grouping the motion vectors of the M sets of coordinates in the up, down, left and right coordinates in the subunits that are adjacent on the up, down, left and right to the first affine motion subunit (P) having the first vertex, which correspond to the first vertex of the first affine motion subunit (P), and the motion vectors of the M sets of coordinates in the up, down, left and right coordinates in the subunits that are adjacent on the up, down, left and right to the first affine motion subunit (P) having the second vertex, which correspond to the second vertex of the first affine motion subunit (P), wherein a first motion vector pair in the M motion vector pairs comprises a motion vector of first coordinates corresponding to the first vertex of the first affine motion subunit (P) and a motion vector of first coordinates corresponding to the second vertex of the first affine motion subunit (P), and the first coordinates are upper coordinates or lower coordinates or left coordinates or right coordinates;
performing calculation on the M motion vector pairs based on the affine motion model, to obtain M motion vectors of the first affine motion subunit (P);
obtaining M second predicted pixel values of the first affine motion subunit (P) based on the M motion vectors of the first affine motion subunit (P); and
obtaining the pixel values of the first affine motion subunit (P) based on the first predicted pixel values of the first affine motion subunit (P) and the M second predicted pixel values.

20. The apparatus according to claim 12, wherein obtaining the pixel values of the first affine motion subunit comprises:
- obtaining first predicted pixel values of the first affine motion subunit based on a motion vector of the first affine motion subunit;
- obtaining motion vectors of M subunits in an upper subunit, a lower subunit, a left subunit, and a right subunit that are adjacent to the first affine motion subunit, wherein M is any integer and 1=<M<=4;
- obtaining M second predicted pixel values of the first affine motion subunit based on the motion vectors of the M subunits; and
- obtaining the pixel values of the first affine motion subunit based on the first predicted pixel values of the first affine motion subunit and the M second predicted pixel values.

\* \* \* \* \*